United States Patent
Propst

(10) Patent No.: US 9,097,016 B2
(45) Date of Patent: *Aug. 4, 2015

(54) BUILDING PANEL SYSTEM

(71) Applicant: PROPST FAMILY LIMITED PARTNERSHIP, Phoenix, AZ (US)

(72) Inventor: John Eugene Propst, Phoenix, AZ (US)

(73) Assignee: PROPST FAMILY LIMITED PARTNERSHIP, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,950

(22) Filed: Feb. 25, 2014

(65) Prior Publication Data

US 2014/0165490 A1 Jun. 19, 2014

Related U.S. Application Data

(63) Continuation of application No. 13/431,053, filed on Mar. 27, 2012, now Pat. No. 8,695,299, which is a continuation-in-part of application No. 13/362,947, filed on Jan. 31, 2012, now Pat. No. 8,458,983, which (Continued)

(51) Int. Cl.
*E04C 1/00* (2006.01)
*E04C 2/288* (2006.01)
(Continued)

(52) U.S. Cl.
CPC ................ *E04C 2/2885* (2013.01); *B32B 5/18* (2013.01); *B32B 13/02* (2013.01); *B32B 17/02* (2013.01);

(Continued)

(58) Field of Classification Search
CPC .......... E04C 2/043; E04C 2/044; E04C 2/06; E04C 2/288; E04C 2/2885; E04C 2002/047; E04C 2002/048; E04B 2/847; E04B 2/8617
USPC ............... 52/309.11, 309.12, 309.16, 309.17, 52/426, 351, 362, 454, 515, 516
See application file for complete search history.

(56) References Cited

U.S. PATENT DOCUMENTS

| 1,681,311 A | 4/1928 | Techmer |
| 1,693,742 A | 12/1928 | Bemis |

(Continued)

FOREIGN PATENT DOCUMENTS

| DE | 102005049428 | 6/2007 |
| WO | 2012001198 | 7/2012 |

OTHER PUBLICATIONS

Wind-Lock, Wind-Devil 2 Fastening System, http://www.wind-lock.com/cat-25-1-5/Fasteners.htm, Leesport, PA, Jul. 27, 2010.

(Continued)

*Primary Examiner* — Robert Canfield
(74) *Attorney, Agent, or Firm* — Schmeiser, Olsen & Watts LLP

(57) ABSTRACT

A building panel structure is disclosed, in which building panels are used to form a structure. The building panel includes a core and a coating covering a portion of the core. In some embodiments the core consists of a frame and one or more than one insulating structural block. The insulating structural blocks can be encapsulated polystyrene (EPS) foam blocks. In some embodiments the coating includes an inner scratch layer and an outer main brown layer. The inner scratch layer can be formed of at least two layers and a fiberglass mesh. The outer main brown layer can include a fiberglass mesh embedded into the outer main brown layer. A coating/frame coupler is disclosed which securely couples the coating to the frame so that the building panel remains strong and stable even if the EPS foam blocks are melted or damaged in extreme conditions such as a fire.

14 Claims, 28 Drawing Sheets

Related U.S. Application Data is a continuation of application No. 13/110,706, filed on May 18, 2011, now Pat. No. 8,127,509, which is a continuation of application No. 12/844,163, filed on Jul. 27, 2010, now Pat. No. 7,984,594.

(60) Provisional application No. 61/296,616, filed on Jan. 20, 2010, provisional application No. 61/511,891, filed on Jul. 26, 2011, provisional application No. 61/560,897, filed on Nov. 17, 2011.

(51) Int. Cl.
*B32B 5/18* (2006.01)
*B32B 13/02* (2006.01)
*B32B 17/02* (2006.01)
*E04C 2/296* (2006.01)
*E04C 2/04* (2006.01)

(52) U.S. Cl.
CPC ............... *E04C 2/288* (2013.01); *E04C 2/296* (2013.01); *B32B 2262/101* (2013.01); *B32B 2266/0228* (2013.01); *E04C 2/043* (2013.01); *E04C 2/044* (2013.01)

(56) References Cited

U.S. PATENT DOCUMENTS

| | | |
|---|---|---|
| 2,091,552 A | 8/1937 | Macauley |
| 2,109,719 A | 3/1938 | Brusse |
| 2,176,938 A | 10/1939 | Troy |
| 2,395,186 A | 2/1946 | Jones |
| 2,902,853 A | 9/1959 | Lofstrom |
| 3,044,919 A | 7/1962 | Stoneburner |
| 3,116,349 A | 12/1963 | Immel |
| 3,145,502 A | 8/1964 | Rubenstein |
| 3,284,980 A | 11/1966 | Dinkel |
| 3,492,196 A | 1/1970 | Moore |
| 3,662,507 A | 5/1972 | Espeland |
| 3,762,935 A | 10/1973 | Leach |
| 3,835,608 A | 9/1974 | Johnson |
| 3,982,368 A | 9/1976 | Perrin |
| 4,044,520 A | 8/1977 | Barrows |
| 4,049,874 A | 9/1977 | Aoyama et al. |
| 4,113,913 A | 9/1978 | Smiley |
| 4,164,933 A | 8/1979 | Alosi |
| 4,186,536 A | 2/1980 | Piazza |
| 4,191,001 A | 3/1980 | Lheureux |
| 4,193,240 A * | 3/1980 | Odoerfer ................... 52/344 |
| 4,237,861 A | 12/1980 | Fayard |
| 4,260,569 A | 4/1981 | Hurst |
| 4,288,962 A | 9/1981 | Kavanaugh |
| 4,314,431 A | 2/1982 | Rabassa |
| 4,342,180 A | 8/1982 | Gibson et al. |
| 4,349,398 A | 9/1982 | Kearns et al. |
| 4,472,919 A * | 9/1984 | Nourse ........................ 52/601 |
| 4,489,530 A | 12/1984 | Chang |
| 4,525,965 A | 7/1985 | Woelfel |
| 4,558,552 A * | 12/1985 | Reitter, II ................ 52/745.19 |
| 4,578,915 A | 4/1986 | Schneller |
| 4,646,498 A * | 3/1987 | Schneller et al. .......... 52/309.12 |
| 4,653,243 A | 3/1987 | Burkett |
| 4,669,240 A | 6/1987 | Amormino |
| 4,774,794 A * | 10/1988 | Grieb ........................ 52/309.7 |
| 4,841,705 A | 6/1989 | Fuhrer |
| 4,852,316 A | 8/1989 | Webb |
| 4,875,322 A | 10/1989 | Rozzi |
| 4,876,151 A | 10/1989 | Eichen |
| 4,882,888 A | 11/1989 | Moore |
| 4,885,884 A * | 12/1989 | Schilger ..................... 52/354 |
| 4,946,512 A | 8/1990 | Fukuroi et al. |
| 4,958,399 A | 9/1990 | Toal et al. |
| 5,003,742 A | 4/1991 | Dettbarn |
| 2,046,071 A | 1/1992 | Alba Vico |
| 5,127,204 A | 7/1992 | Braun |
| 5,129,628 A | 7/1992 | Vesper |
| 5,184,808 A | 2/1993 | Vesper |
| 5,231,813 A | 8/1993 | Drawdy |
| 5,246,640 A | 9/1993 | Bryant |
| 5,248,549 A | 9/1993 | Silva et al. |
| 5,279,089 A | 1/1994 | Gulur |
| 5,335,472 A | 8/1994 | Phillips |
| 5,353,560 A | 10/1994 | Heydon |
| 5,404,685 A | 4/1995 | Collins |
| 5,410,852 A | 5/1995 | Edgar et al. |
| 5,473,849 A | 12/1995 | Jones, Jr. et al. |
| 5,502,940 A | 4/1996 | Fifield |
| 5,596,853 A * | 1/1997 | Blaney et al. ................ 52/223.7 |
| 5,735,090 A | 4/1998 | Papke |
| 5,740,643 A | 4/1998 | Huntley |
| 5,745,531 A | 4/1998 | Sawahashi et al. |
| 5,758,461 A | 6/1998 | McManus |
| 5,758,463 A | 6/1998 | Mancini, Jr. |
| 5,771,649 A | 6/1998 | Zweig |
| 5,826,388 A | 10/1998 | Irving |
| 5,842,276 A | 12/1998 | Asher et al. |
| 5,916,392 A | 6/1999 | Ghanbari |
| 5,921,046 A | 7/1999 | Hammond, Jr. |
| 5,966,885 A | 10/1999 | Chatelain |
| 5,979,131 A | 11/1999 | Remmele et al. |
| 5,996,297 A * | 12/1999 | Keith et al. ...................... 52/410 |
| 6,006,480 A | 12/1999 | Rook |
| 6,044,603 A | 4/2000 | Bader |
| 6,112,489 A | 9/2000 | Zweig |
| 6,119,422 A | 9/2000 | Clear et al. |
| 6,119,432 A | 9/2000 | Niemann |
| 6,263,628 B1 | 7/2001 | Griffin G. E. Steel Company |
| 6,314,695 B1 | 11/2001 | Belleau |
| 6,314,704 B1 | 11/2001 | Bryant |
| 6,355,333 B1 | 3/2002 | Waggoner et al. |
| 6,401,413 B1 | 6/2002 | Niemann |
| 6,434,900 B1 | 8/2002 | Masters |
| 6,438,923 B2 | 8/2002 | Miller |
| 6,526,714 B1 | 3/2003 | Billings et al. |
| 6,622,452 B2 | 9/2003 | Alvaro |
| 6,698,150 B1 | 3/2004 | DiLorenzo |
| 6,715,249 B2 | 4/2004 | Rusek et al. |
| 6,729,094 B1 * | 5/2004 | Spencer et al. ................... 52/414 |
| 6,807,786 B1 | 10/2004 | Peck |
| 6,898,908 B2 | 5/2005 | Messenger et al. |
| 6,918,218 B2 * | 7/2005 | Greenway ........................ 52/267 |
| 6,931,809 B1 | 8/2005 | Brown et al. |
| 7,036,284 B1 | 5/2006 | Larson |
| 7,100,336 B2 | 9/2006 | Messenger et al. |
| 7,194,845 B2 | 3/2007 | Belleau |
| 7,204,065 B2 | 4/2007 | Naji |
| 7,254,925 B2 | 8/2007 | Stefanutti et al. |
| 7,337,591 B2 | 3/2008 | Molina |
| 7,610,911 B2 | 11/2009 | Nuemann et al. |
| 7,681,368 B1 * | 3/2010 | Rubio ........................ 52/309.12 |
| 7,709,091 B2 | 5/2010 | Villani et al. |
| 7,882,666 B2 | 2/2011 | Karalic |
| 7,902,092 B2 | 3/2011 | Egan et al. |
| 7,939,747 B2 | 5/2011 | Stimson et al. |
| 7,984,594 B1 | 7/2011 | Propst |
| 8,051,611 B2 | 11/2011 | Serino et al. |
| 8,127,509 B2 | 3/2012 | Propst |
| 8,286,297 B1 | 10/2012 | Murray |
| 8,458,983 B2 | 6/2013 | Propst |
| 8,555,583 B2 * | 10/2013 | Ciuperca ................... 52/309.12 |
| 8,683,765 B2 * | 4/2014 | Hillers ........................ 52/309.4 |
| 8,800,227 B2 * | 8/2014 | LeBlang ................... 52/309.12 |
| 2002/0139075 A1 | 10/2002 | Shubow et al. |
| 2002/0157336 A1 | 10/2002 | Worrell et al. |
| 2004/0016194 A1 | 1/2004 | Stefanutti et al. |
| 2004/0043682 A1 | 3/2004 | Taylor et al. |
| 2004/0065034 A1 * | 4/2004 | Messenger et al. ........ 52/309.11 |
| 2004/0074184 A1 | 4/2004 | Naji |
| 2005/0053723 A1 | 3/2005 | Brzoska |
| 2005/0144901 A1 | 7/2005 | Egan et al. |
| 2008/0155919 A1 * | 7/2008 | Keshishian et al. ........ 52/309.11 |
| 2008/0200086 A1 | 8/2008 | Porter et al. |
| 2008/0257222 A1 | 10/2008 | Wallner |
| 2009/0011212 A1 | 1/2009 | Dubey et al. |

(56) References Cited

U.S. PATENT DOCUMENTS

| | | | |
|---|---|---|---|
| 2009/0031656 A1* | 2/2009 | Hunt-Hansen et al. | 52/344 |
| 2009/0044476 A1 | 2/2009 | Agneloni | |
| 2009/0239430 A1 | 9/2009 | Egan et al. | |
| 2010/0071292 A1 | 3/2010 | Futterman | |
| 2010/0307091 A1 | 12/2010 | Diaz, Jr. et al. | |
| 2011/0036035 A1* | 2/2011 | Dettbarn et al. | 52/409 |
| 2011/0154764 A1 | 6/2011 | Wang et al. | |
| 2011/0220093 A1 | 9/2011 | Fernandez-Fernandez | |
| 2011/0281066 A1 | 11/2011 | Andrews et al. | |
| 2012/0207975 A1 | 8/2012 | Andrews et al. | |
| 2012/0276369 A1 | 11/2012 | Jing | |
| 2014/0115804 A1 | 5/2014 | Propst | |
| 2014/0174647 A1 | 6/2014 | Cuiperca | |
| 2014/0245684 A1* | 9/2014 | Thorsnes | 52/454 |

OTHER PUBLICATIONS

Dryvit Systems, Inc., What are Dryvit Outsulation Systems, http://www.dryvit.com/systems.asp?country_id=1, West Warwick, RI, Jul. 27, 2010.

Propst, J., Composite Building and Panel Systems, Patent Cooperation Treaty Application Serial No. PCT/US 11/20563, filed Jan. 7, 2011, International Search Report and Written Opinion, dated Jun. 9, 2011.

Primus, Arctic-Modified Adhesive and Base Coat, DS414, 3 pages, from Dryvit Systems, Inc. 1991.

Webster's Third New International Dictionary definition of "stucco", 1 page, 1993.

Finestone Pebbletex Finishes, Product Bulletin 1017861, BASF The Chemical Company, 4 pages, May 2008.

Panacor Sistemas De Construcción, Panel 3D Panacor Technical Manual, Document was issued to representative of Propst Family Limited Partnership LLC, the applicant for patent application Costa Rica 2012-0377, on Jan. 14, 2013, 18 pages, Costa Rica.

Panacor Sistemas De Construcción, Panel-I Panacor Technical Manual, Document was issued to representative of Propst Family Limited Partnership LLC, the applicant for patent application Costa Rica 2012-0377, on Jan. 14, 2013, 36 pages, Costa Rica.

Panacor Sistemas De Construcción, Panel-I Panacor Information Brochure, Document was issued to representative of Propst Family Limited Partnership LLC, the applicant for patent application Costa Rica 2012-0377, on Jan. 14, 2013, 9 pages, Costa Rica.

Propst, J., Building Panel System, Patent Cooperation Treaty Application Serial No. PCT/US 12/48065, filed Jul. 25, 2012, International Search Report and Written Opinion, dated Mar. 29, 2013.

Hawley's Condensed Chemical Dictionary, Fourteenth Edition, (C) 2001, definition of "ceramic" p. 229.

\* cited by examiner

BUILDING PANEL SYSTEM

CROSS REFERENCE TO RELATED APPLICATIONS

This application is a continuation of the earlier U.S. Utility patent application to John Eugene Propst entitled "Building Panel System", Ser. No. 13/431,053, filed Mar. 27, 2012, which is a continuation-in-part of the earlier U.S. Utility patent application to John Eugene Propst entitled "Composite Building and Panel Systems," Ser. No. 13/362,947, issued Jun. 11, 2013 as U.S. Pat. No. 8,458,983, which is a continuation of the earlier U.S. Utility patent application to John Eugene Propst entitled "Composite Building and Panel Systems," Ser. No. 13/110,706, filed May 18, 2011, now issued as U.S. Pat. No. 8,127,509, which is a continuation of the earlier U.S. Utility patent application to John Eugene Propst entitled "Composite Building and Panel Systems," Ser. No. 12/844,163, filed Jul. 27, 2010, now issued as U.S. Pat. No. 7,984,594, the disclosures of which are hereby incorporated entirely herein by reference. U.S. Utility patent application Ser. No. 12/844,163, claims priority to U.S. Provisional patent application to John Propst entitled "Layered Building Panel System," Ser. No. 61/296,616, filed Jan. 20, 2010, the disclosure of which is hereby incorporated entirely herein by reference. U.S. Utility patent application Ser. No. 13/431,053 also claims priority to U.S. Provisional patent application to John Eugene Propst entitled "Composite Building and Panel Systems," Ser. No. 61/511,891, filed Jul. 26, 2011, and to U.S. Provisional patent application to John Eugene Propst entitled "Composite Panel Coating Systems," Ser. No. 61/560,897, filed Nov. 17, 2011, the disclosures of which are hereby incorporated entirely herein by reference.

BACKGROUND OF THE INVENTION

1. Technical Field

This invention relates generally to materials for constructing buildings and structures and more specifically to coated building panels.

2. State of the Art

Buildings have historically been constructed of brick, cement block, wood frame and, more recently, steel frame and stucco. The material and techniques used in constructing buildings is evolving in an effort to reduce cost, increase energy efficiency, reduce the amount of wood usage in buildings, and to reduce material waste. Cement block and brick construction requires a large amount of manpower to create a building, which raises the cost of the building. Wood has long been a staple material in building construction, but recently there is a desire to preserve forest resources. Wood is inherently more susceptible to damage from inclement weather, moisture, mold, fire, and insect infestation. Also, when wood is used to create a building there can be a large amount of waste. This is because standard sized boards are sent to the construction site, which must be cut and assembled at the building site into a building. The labor involved in cutting lumber to size results in high labor costs and a large amount of lumber wasted from boards cut to size.

It is also desirable to increase the energy efficiency of buildings in order to reduce the energy costs during the lifetime of the building. Cement block, brick, and wood frame and stucco construction do not provide the high level of energy efficiency that can be obtained from newer materials.

Foam blocks have become a popular alternative and are environmentally sustainable as compared to traditional wood, cement block, and brick construction materials. Foam block systems are lightweight, can be molded or formed into any needed shape, result in a thermally efficient building construction, and require less skilled manpower to form into a building structure. Other benefits include, but are not limited to, a resistance to moisture, mold, fire and insect damage. The foam blocks are constructed using materials which are recyclable and renewable, provide good insulating qualities, and are often themselves made from recycled materials. Alternatively, construction blocks can also be made from other environmentally friendly materials such as straw, wood fibers, paper, and glass, for example.

One problem with some of the new building materials such as foam block is that the structural strength of a building element that is made with foam blocks may not be as high as when wood, brick or cement block are used to form the building element. This can be particularly important in areas where buildings are required to withstand high winds or earthquakes. There is a need for a prefabricated building panel system which minimizes construction time, uses environmentally friendly materials, and results in a building panel with high structural strength and structural integrity.

Another problem with foam block structures is that the foam blocks melt in extreme conditions such as a fire. When the foam blocks melt the structure becomes unstable and collapses. This can be dangerous to building occupants and to firefighters. There is a need for a foam block building panel system which is structurally strong, and which is capable of withstanding extreme conditions such as a fire that melts the foam block portion of the panel.

DISCLOSURE OF THE INVENTION

This invention relates generally to materials for constructing buildings and structures and more specifically to coated building panels. Disclosed is a building panel comprising a building panel core and a coating covering a portion of the core. In some embodiments the core includes a front surface, a rear surface, and one or more than one side. The coating includes an inner scratch layer and an outer main brown layer. The inner scratch layer is a cementitious mixture. The outer main brown layer is a cementitious mixture. In some embodiments the inner scratch layer and the outer main brown layer are interdigitated, where each of a plurality of crests in the inner scratch layer reside in a corresponding one of a plurality of grooves in the outer main brown layer. In some embodiments the outer main brown layer includes a fiberglass mesh. In some embodiments the outer main brown layer includes cement, aggregate, and fiberglass mesh. In some embodiments the outer main brown layer includes cement, aggregate, and acrylic bonder. In some embodiments the outer main brown layer includes cement, aggregate, and fiberglass strands. In some embodiments the outer main brown layer includes cement, aggregate, acrylic bonder, and fiberglass mesh.

In some embodiments the outer main brown layer includes cement, aggregate, acrylic bonder, fiberglass strands, and fiberglass mesh. In some embodiments the scratch layer consists of at least two layers. In some embodiments the scratch layer includes a first scratch layer A of cement, aggregate, and acrylic bonder, and a second scratch layer B which includes cement, aggregate, acrylic bonder, fiberglass strands, and fiberglass mesh. In some embodiments the inner scratch layer includes a wire mesh. In some embodiments the outer main brown layer aggregate includes perlite. In some embodiments the outer main brown layer aggregate includes sand. In some embodiments the core includes a frame and one or more than one insulating structural block coupled to the frame. In some embodiments the insulating structural block is composed of expanded polystyrene foam. In some embodiments the frame is embedded in the one or more than one insulating structural block. In some embodiments the building panel includes a control joint.

In some embodiments the inner scratch layer includes a first scratch layer A and a second scratch layer B. In some embodiments the first scratch layer A is a base coat formed of a cementitious mixture with a fiberglass mesh embedded in the cementitious mixture while it is still wet. In some embodiments the second scratch coat B is a cementitious mixture. In some embodiments the outer main brown layer is a cementitious mixture with a fiberglass mesh embedded in the outer main brown layer while it is still wet.

Disclosed is a building panel that includes a building panel core, a coating covering a portion of the core, and a coating/frame coupler, where the coating/frame coupler holds the coating in a fixed spaced relationship with respect to the frame portion of the core. The building panel core comprises a frame and one or more than one insulating structural block. The coating/frame coupler includes a coating-coupled portion, a frame-coupled portion, and an extension portion. The coating-coupled portion is fixedly coupled to the coating. The frame-coupled portion is fixedly coupled to the frame. The extension portion couples the coating-coupled portion to the frame-coupled portion.

In some embodiments the coating/frame coupler comprises a piece of fiberglass mesh. In some embodiments the coating/frame coupler comprises a screw and a washer. In some embodiments the coating-coupled portion includes a first coating-coupled portion and a second coating-coupled portion. In some embodiments the first coating-coupled portion is a first portion of a piece of fiberglass mesh. In some embodiments the second coating-coupled portion is a washer. In some embodiments the frame-coupled portion includes a first frame-coupled portion and a second frame-coupled portion. In some embodiments the first frame-coupled portion is a second portion of the piece of fiberglass mesh. In some embodiments the second frame-coupled portion is a screw end. In some embodiments the extension portion includes a third portion of the piece of fiberglass mesh. In some embodiments the extension portion includes a screw shaft. In some embodiments the second coating-coupled portion is a second portion of the piece of fiberglass mesh. In some embodiments the first coating-coupled portion is coupled to a first coating on a first surface of the core, and the second coating-coupled portion is coupled to a second coating on a second surface of the core. In some embodiments the first coating-coupled portion is coupled to a first portion of a first coating on a first surface of the core, and the second coating-coupled portion is coupled to a second portion of the first coating on the first surface of the core.

Disclosed is a coating/frame coupler, where the coating/frame coupler holds a building panel coating in a fixed spaced relationship with respect to a building panel frame. The building panel core comprises a frame and one or more than one insulating structural block. The coating/frame coupler includes a coating-coupled portion, a frame-coupled portion, and an extension portion. The coating-coupled portion is fixedly coupled to the coating. The frame-coupled portion is fixedly coupled to the frame. The extension portion couples the coating-coupled portion to the frame-coupled portion.

In some embodiments the coating/frame coupler comprises a piece of fiberglass mesh. In some embodiments the coating/frame coupler comprises a screw and a washer. In some embodiments the coating/frame coupler includes other types of elements. In some embodiments the coating-coupled portion includes a first coating-coupled portion and a second coating-coupled portion. In some embodiments the first coating-coupled portion is a first portion of a piece of fiberglass mesh. In some embodiments the second coating-coupled portion is a washer. In some embodiments the frame-coupled portion includes a first frame-coupled portion and a second frame-coupled portion. In some embodiments the first frame-coupled portion is a second portion of the piece of fiberglass mesh. In some embodiments the second frame-coupled portion is a screw end. In some embodiments the extension portion includes a third portion of the piece of fiberglass mesh. In some embodiments the extension portion includes a screw shaft. In some embodiments the second coating-coupled portion is a second portion of the piece of fiberglass mesh. In some embodiments the first coating-coupled portion is coupled to a first coating on a first surface of the core, and the second coating-coupled portion is coupled to a second coating on a second surface of the core. In some embodiments the first coating-coupled portion is coupled to a first portion of a first coating on a first surface of the core, and the second coating-coupled portion is coupled to a second portion of the first coating on the first surface of the core.

A method of forming a building panel is disclosed which includes the step of covering a first portion of a building panel core with a first coating, where the first coating includes a piece of fiberglass mesh. The method of forming a building panel according to the invention also includes the step of covering a second portion of the building panel core with a second coating, where the second coating includes the piece of fiberglass mesh. In some embodiments the method includes the step of coupling the building panel core to a foundation, where the foundation covers the first coating. In some embodiments the method includes the step of allowing the first coating to cure. In some embodiments the method includes the step of allowing the second coating to cure. In some embodiments the first coating includes a first and a second piece of fiberglass mesh. In some embodiments the second coating includes the first and the second piece of fiberglass mesh.

The foregoing and other features and advantages of the present invention will be apparent from the following more detailed description of the particular embodiments of the invention, and as illustrated in the accompanying drawings.

DETAILED DESCRIPTION OF EMBODIMENTS OF THE INVENTION

As discussed above, embodiments of the present invention relate to material used in constructing buildings and more specifically to building panels, coated building panels, and building panel structures.

The use of environmentally friendly, insulating, lightweight block materials for use as the walls, roofs, floors and other structures in buildings is increasing in popularity. The blocks of material are being used to replace concrete blocks and insulated wood and stucco walls. These blocks are structural elements which provide insulation properties and a shaped mass which defines the shape of the structure to be built. Expanded polystyrene (EPS) foam blocks are a popular material, but other materials such as straw, plastic, and recycled elements are also being used to create insulating structural blocks. These new building materials use less wood, decrease construction waste, often use recycled materials, and create a building which is more energy efficient than standard wood frame and plaster construction buildings. Insulating structural blocks such as EPS foam blocks are often lightweight and can be molded or shaped easily to create any desired shape. These new block materials, including EPS foam blocks, sometimes do not posses the necessary structural strength for specific building structures. In these cases it is necessary to add structural elements to the building panels made from insulating structural block materials. Disclosed herein are building panels and methods of creating building panels using insulating structural blocks, frames, and coatings over the blocks and frames to create structurally strong structures and building panels, while still retaining the lightweight, environmentally friendly, and energy efficient characteristics of the insulating structural blocks.

Figure 1:
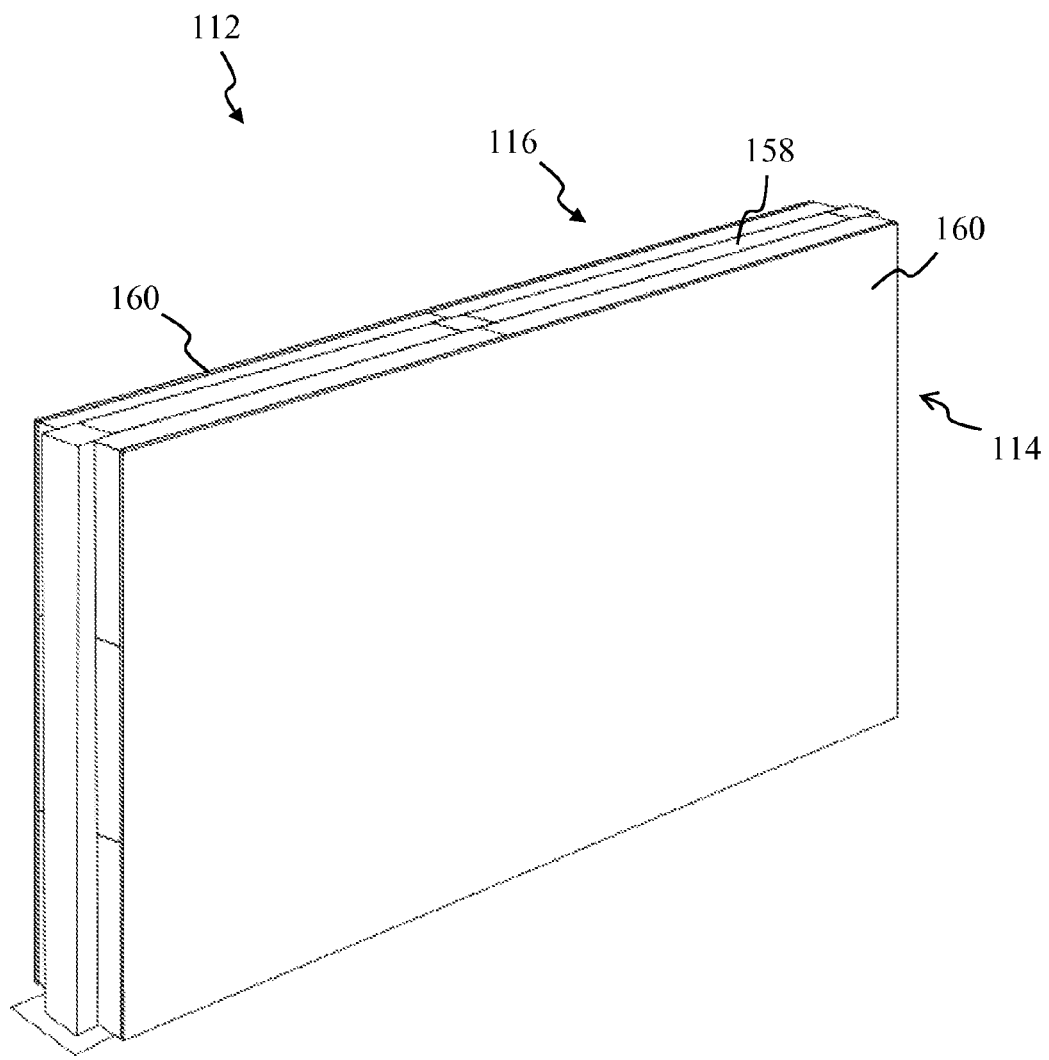
FIG. 1 is a perspective view of one embodiment of composite building panel 112 according to the invention.

FIG. 1 shows a perspective view of one embodiment of a building panel according to the invention. A building panel means a panel or element which is used in constructing a form, structure, building, or edifice. A building panel according to the invention can take many different forms. FIG. 1 shows one embodiment of a building panel according to the invention as building panel 112. Building panel 112 is shown including core 158 and coating 160 covering a portion of core 158. Building panel 112 is used to form walls, floors, ceilings, beams, or other elements used in creating a structure, edifice, or building.

Building panel (also referred to as composite building panel or just panel) 112 is shown in FIG. 1 as having a rectangular shape for use as a wall or block fence structure, for example. Building panel 112 can be formed in any size and shape according to the needs of the structure to be built. In some embodiments building panel 112 is square, or rectangular or round, or oval, oblong or elongated. Building panel 112 can be curved, or part curved and part rectangular. Building panel 112 can take any shape. Building panel 112 takes a shape according to the shape of the structure to be built. Core 158 forms the basic shape, and coating 160 covers a portion of core 158 to add strength to building panel 112, to form an impermeable layer on a portion of core 158, and/or to provide an aesthetically pleasing surface for exterior finishing. Building panel 112 has first surface 114 which includes coating 160, and second surface 116 which includes coating 160. Coating 160 will be discussed in detail shortly.

Figure 2:
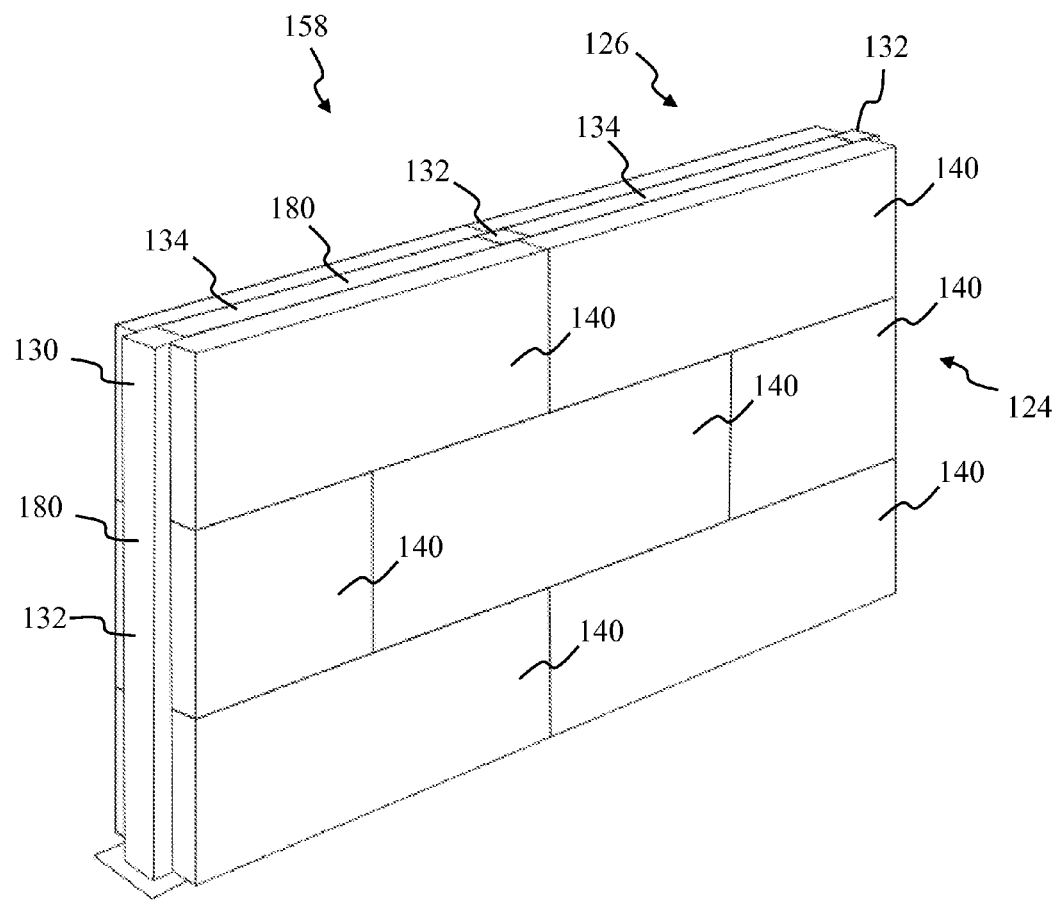
FIG. 2 is a perspective view of core 158 of building panel 112 of FIG. 1.
Figure 3:
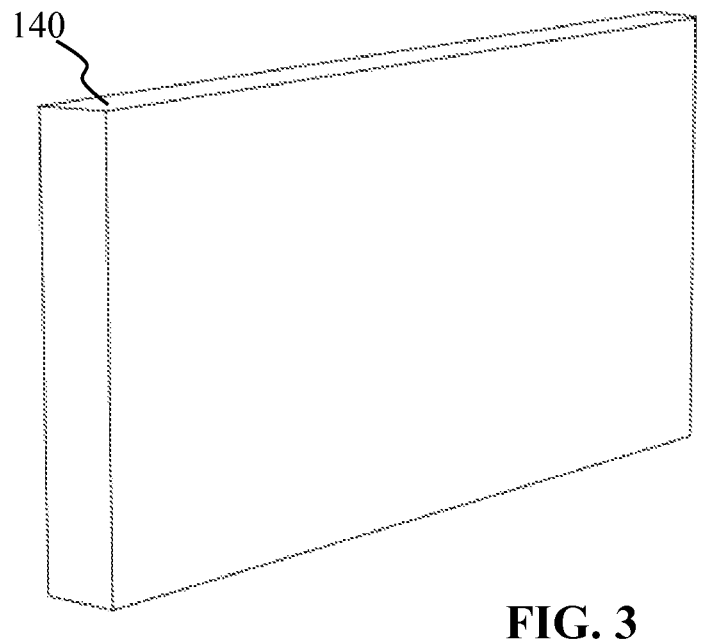
FIG. 3 is a perspective view of one embodiment of insulating structural block 140 that can be used with building panel 112 according to the invention.
Figure 4:
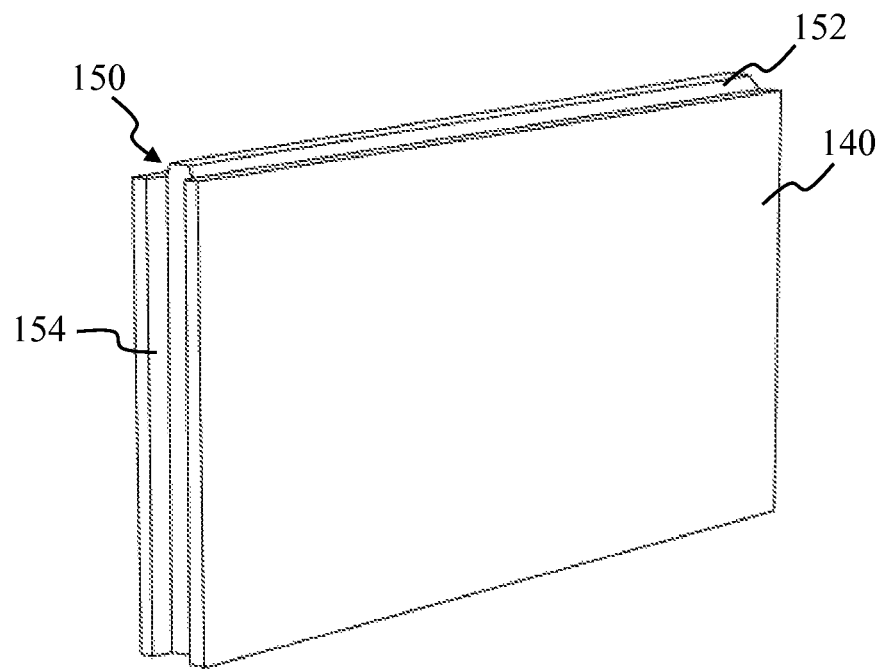
FIG. 4 is a perspective view of another embodiment of insulating structural block 140 that can be used with building panel 112 according to the invention, with insulating structural block 140 of FIG. 4 having interlocking features 150.
Figure 5:
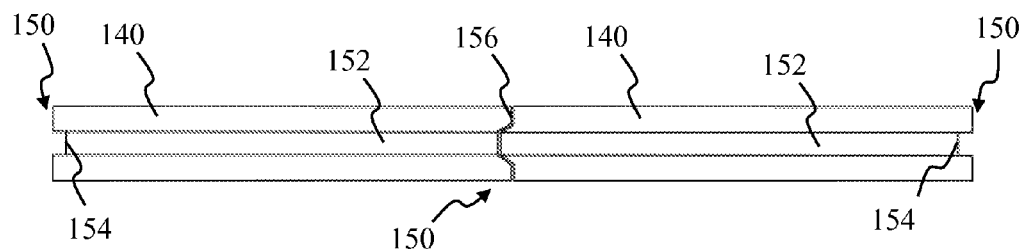
FIG. 5 is a top view of two interlocked insulating structural blocks 140 of building panel 112 of FIG. 1, with insulating structural blocks 140 having interlocking features 150.

FIG. 2 is a perspective view of core 158 of building panel 112 of FIG. 1. Building panel 112 is formed of core 158 and coating 160, where coating 160 covers a portion of core 158. Core 158 and coating 160 can take many different forms. Core 158 in this embodiment has front surface 124, rear surface 126, and multiple sides 180 (two of four sides 180 shown) as shown in FIG. 2. Coating 160 according to the invention covers a portion core 158. In this embodiment coating 160 covers both front surface 124 and rear surface 126. Core 158 is formed in this embodiment of frame 130 and one or more than one insulating structural block 140, as shown in FIG. 2 through FIG. 5. In this embodiment core 158 includes more than one insulating structural block 140. In some embodiments core 158 includes one insulating structural block 140. FIG. 3 is a perspective view of an insulating structural block 140 that can be used in building panel 112 according to the invention. FIG. 4 is a perspective view of another insulating structural block 140 that can be used in composite building panel 112 according to the invention. In FIG. 4 insulating structural block 140 includes interlock elements 150. Interlock elements 150 are used to interlock multiple insulating structural blocks 140 to each other and to interlock insulating structural blocks 140 to frame 130. FIG. 5 is a top view of two interlocked insulating structural blocks 140 of building panel 112 of FIG. 1, with interlocking features 150 which interlock insulating structural blocks 140 and frame 130 as detailed in FIG. 6 through FIG. 8.

In some embodiments of building panel 112, core 158 is made solely of insulating structural blocks 140. In some embodiments core 158 is made of insulating structural blocks 140 and frame 130, as shown in FIG. 2. In some embodiments core 158 is made of other elements besides insulating structural blocks 140 and frame 130. Core 158 can be formed of any material or materials that provide the necessary building-shaped elements and that accepts coating 160 to create building panel 112 according to the invention. Core 158 can be formed of wood, metal, recycled materials, straw, concrete blocks, plastic, or any other material or combination of materials. Insulating structural blocks are also referred to in this document as simply "blocks".

Frame 130 in this embodiment creates the skeletal structure for the walls, floors, ceiling, beams, or other building elements that are needed to form a structure using building panel 112. Frame 130 in the embodiment shown in FIG. 2 includes vertical members 132 and horizontal members 134. In this embodiment frame 130 is formed of galvanized steel. Frame 130 according to the invention can be made of other structural material such as wood, aluminum, other metals, plastic, recycled material, etc. In this embodiment frame 130 is formed from 4"×4"×3⁄16" galvanized steel box tubing. Horizontal members 134 and vertical members 132 are coupled in a manner which holds the members together solidly. In some embodiments mechanical attachments such as bolts are used. In some embodiments the members of frame 130 are welded together. In some embodiments the individual members of frame 130 connect together at angles other than horizontal and vertical. Diagonal frame members are used in some embodiments of frame 130. In some embodiments frame 130 includes metal straps running diagonally. It is to be understood that frame 130 according to the invention can take many different shapes and sizes according to the specifics of the structure to be built. Frame 130 can be formed of many different materials according to the structural strength needed by the structure to be built.

Frame 130 in this embodiment is embedded in insulating structural blocks 140. Frame 130 being embedded in blocks 140 means that the majority of frame 130 is encased in blocks 140, with a minimum of surface area of frame 130 not covered by blocks 140. Frame 130 is embedded in insulating structural blocks 140 by cutting blocks 140 into shapes that will encircle and couple to frame 130. Having frame 130 embedded in insulating structural blocks 140 provides several advantages for building panel 112. Frame 130 being embedded in blocks 140 provides structural strength to core 158 and yet leaves most of the outer surface of core 158 as a surface of blocks 140, so that the outer surface of core 158 can be easily shaped and covered with coating 160. This allows core 158 and building panel 112 to be shaped for aesthetically pleasing shapes, and provides a surface which accepts and retains coating 160 for strength and exterior finishing. In this embodiment, where frame 130 is embedded in blocks 140, there are portions of frame 130 which are not covered by block 140 so that frame 130 can be connected to other frames and structures, but the majority of frame 130 is embedded in blocks 140. In other embodiments of building panel 112 frame 130 is not embedded in blocks 130, meaning that significant portions of frame 130 are on the exterior surface of core 158. Some of these embodiments will be discussed later in this document.

Insulating structural blocks 140 have several purposes, including defining the shape of the building panel 112 being created, providing insulating properties, and providing a surface for applying coating 160 or other coatings or layers. Insulating structural blocks 140 in core 158 of FIG. 2 are used to enclose frame 130 elements and to form the desired shape of the structure to be built with building panel 112. Some embodiments of insulating structural blocks 140 according to the invention are shown in FIG. 3, FIG. 4 and FIG. 5. Blocks 140 are often formed to interlock with each other and with frame 130 as shown in FIG. 2, FIG. 4, and FIG. 5. In this embodiment insulating structural blocks 140 according to the invention are made of expanded polystyrene (EPS) foam, creating an EPS foam insulating structural block 140. EPS foam blocks provide high energy efficiency and are lightweight. EPS foam can be created from recycled materials and can itself be recycled. Another desirable feature of EPS foam block 140 is that it can be easily molded or cut into any desired shape. FIG. 4 and FIG. 5 shows EPS foam insulating structural blocks 140 that have been cut to include interlock elements 150, where interlock elements 150 in this embodiment include tongue 152 and groove 154. Blocks 140 can be made into any shape, size, and structure according to the structure being built using building panel 112. In this embodiment insulating structural blocks 140 are 4'×8'×6" EPS foam insulating structural blocks, which have interlocking elements 150 cut into them so that they interlock with themselves and with frame 130 to create core 158 as shown in FIG. 2. In this embodiment one pound density EPS foam is used for blocks 140 but any suitable material and density can be used according to the invention which provides suitable structural characteristics. Blocks 140 are connected to each other and to concrete in this embodiment using a polymer-based acrylic adhesive 156 such as Primus sold by Dryvit Systems Inc. (Dryvit). Blocks 140 are coupled to metal or wood in this embodiment using a water-based acrylic copolymer adhesive such as Adhesive for EPS (ADEPS) from Dryvit. In some embodiments insulating structural blocks 140 and frame 130 are coupled to other members and to each other using different adhesives, glues, mechanical attachments, or other suitable coupling means.

In this embodiment insulating structural block 140 is made of EPS foam. Insulating structural block 140 according to the invention can be made of other materials, including but not limited to straw, wood, plastic, paper, concrete, or recycled materials.

In the embodiment of core 158 of FIG. 2, insulating structural block 140 is cut to shape from the rectangular EPS foam blocks 140 as shown in FIG. 3 to create the shaped insulating structural blocks 140 as shown in FIG. 4. Cutouts and interlocking elements are cut from blocks 140 to create a block 140 shape that will enclose frame 130, interlock with other blocks 140 and frame 130, and provide a surface of the desired shape for the structure to be built. Blocks 140 according to the invention can be molded to shape or formed to the correct size and shape using methods such as slicing, melting, or other block-shaping methods. Block 140 can be formed to any size and shape needed to create the structure being formed, such as walls, floors, roofs, ceilings, beams, fences, bridges, edifices, offices, etc. Blocks 140 and frame 130 can be formed into any size and shape to create core 158 and building panel 112 in any size and shape to form the desired structure.

Openings and passageways for utilities, air flow, or other types of access through building panel 112 can be easily cut into core 158 as desired. Openings for windows and doors can be formed in core 158.

Figure 7:
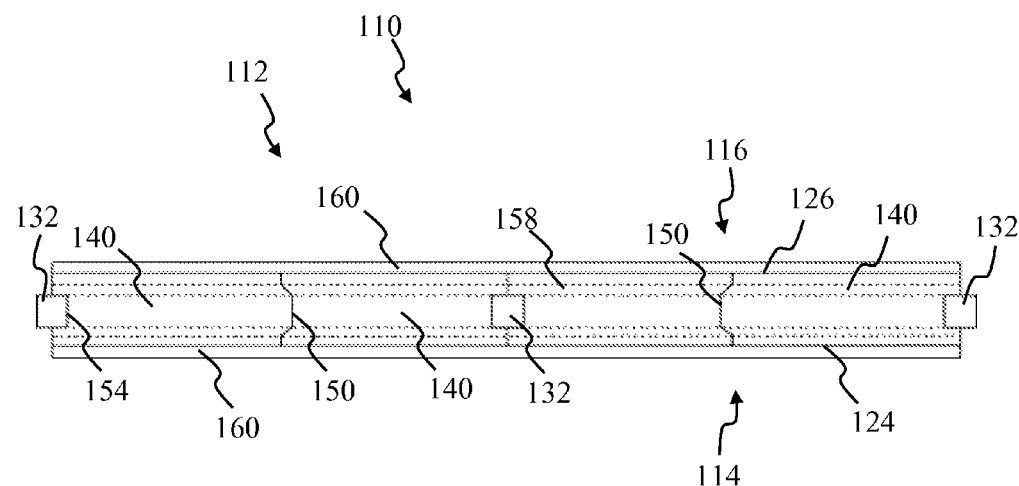
FIG. 7 shows horizontal cross-section 7-7 of building panel 112 of FIG. 6.
Figure 6:
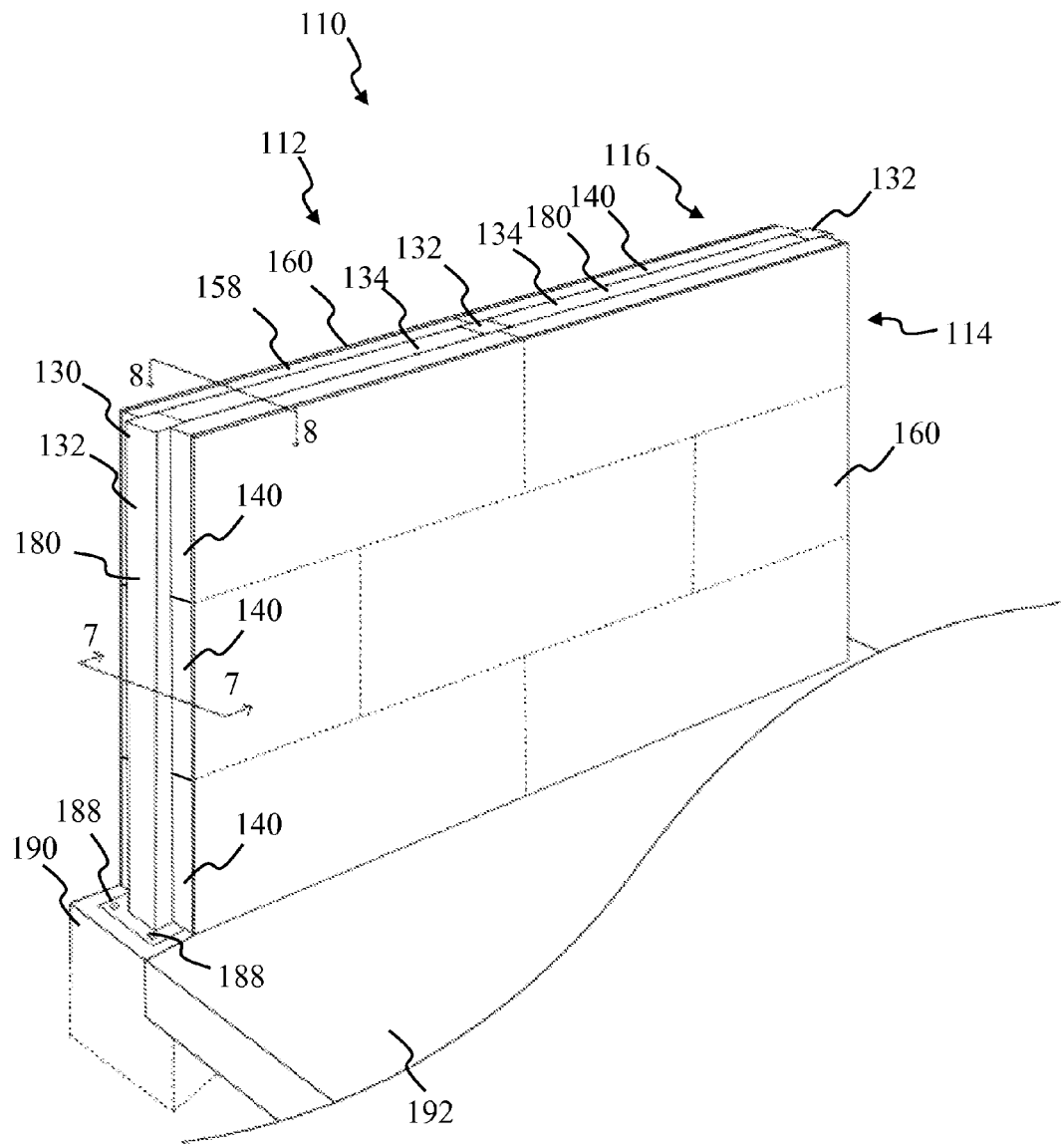
FIG. 6 shows a perspective view of core 158 with coating 160 applied, creating building panel 112 of building panel structure 110 according to the invention.
Figure 8:
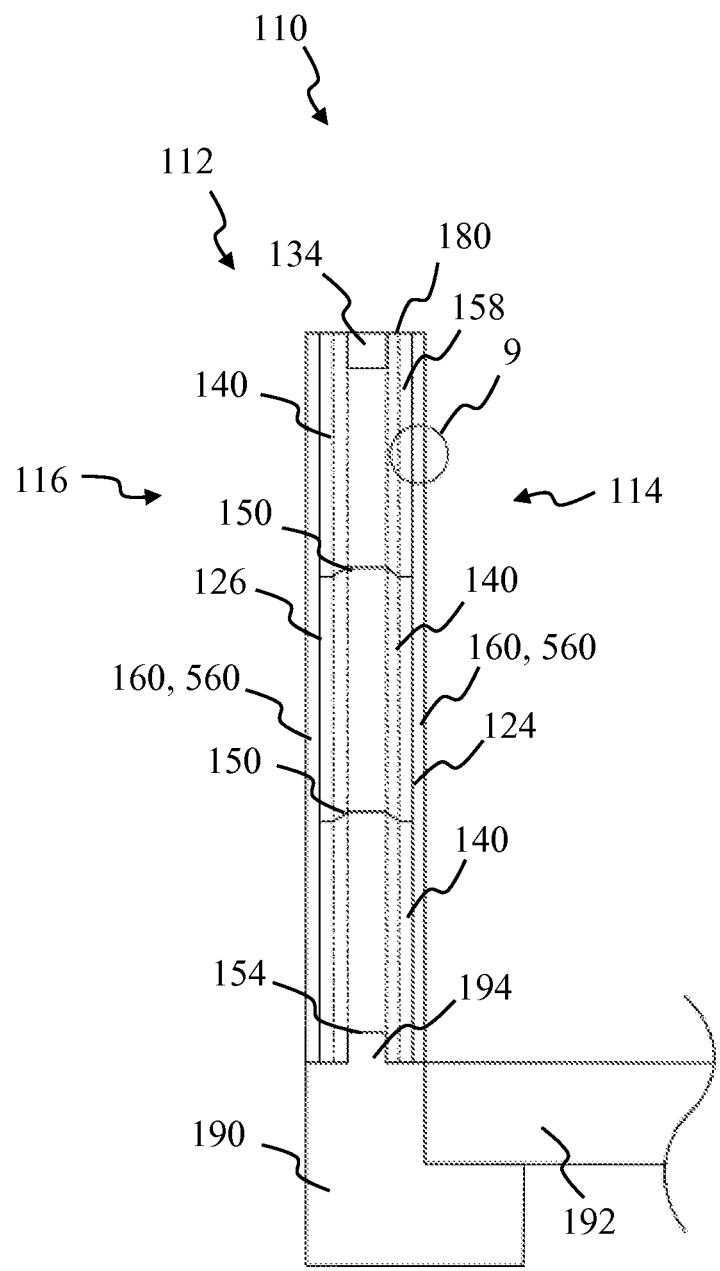
FIG. 8 shows vertical cross-section 8-8 of building panel 112 of FIG. 6.
Figure 9:
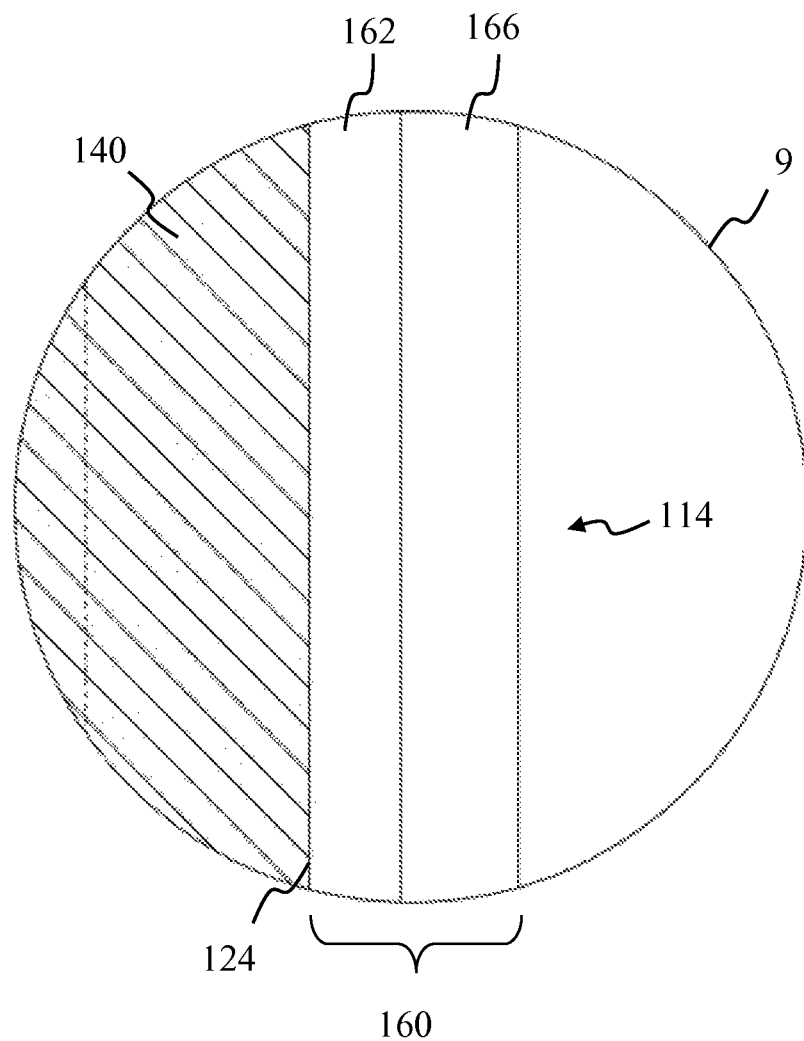
FIG. 9 shows a close-up cross-section of one embodiment of coating 160 according to the invention taken at section 9 of FIG. 8.
Figure 10:
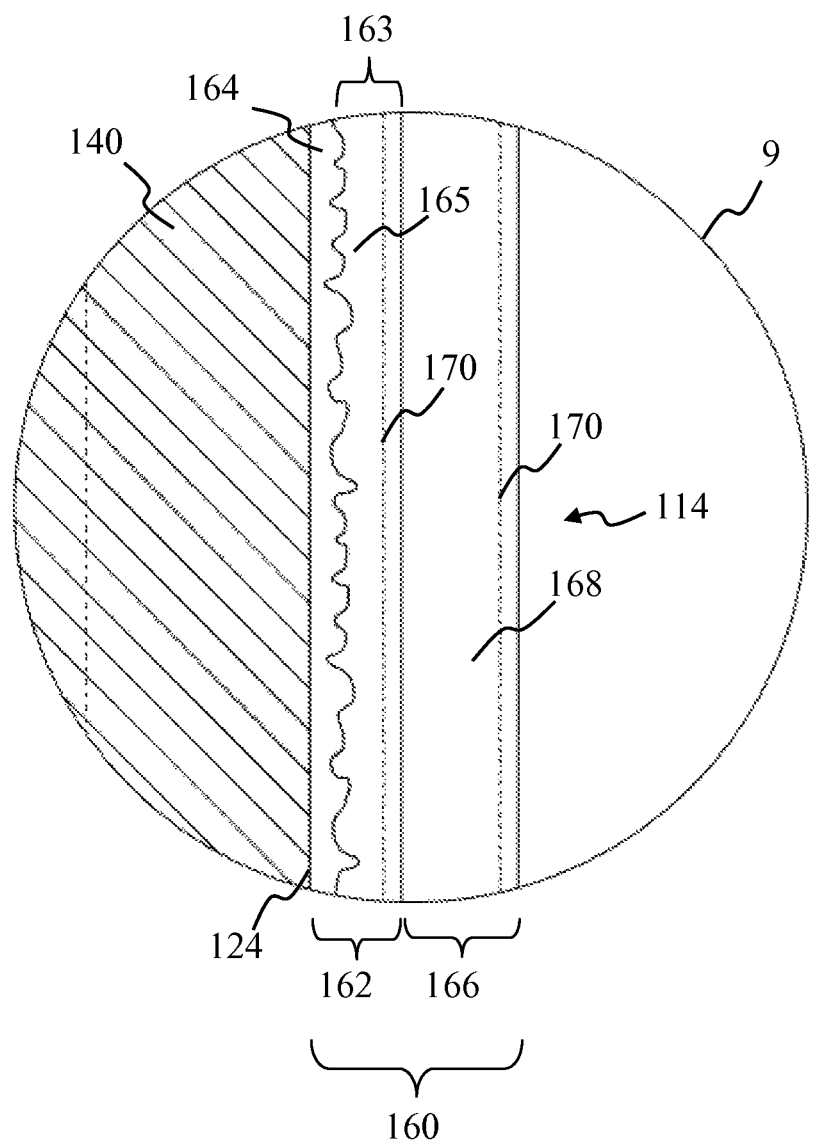
FIG. 10 shows a close-up cross-section of another embodiment of coating 160 according to the invention taken at section 9 of FIG. 8.
Figure 11:
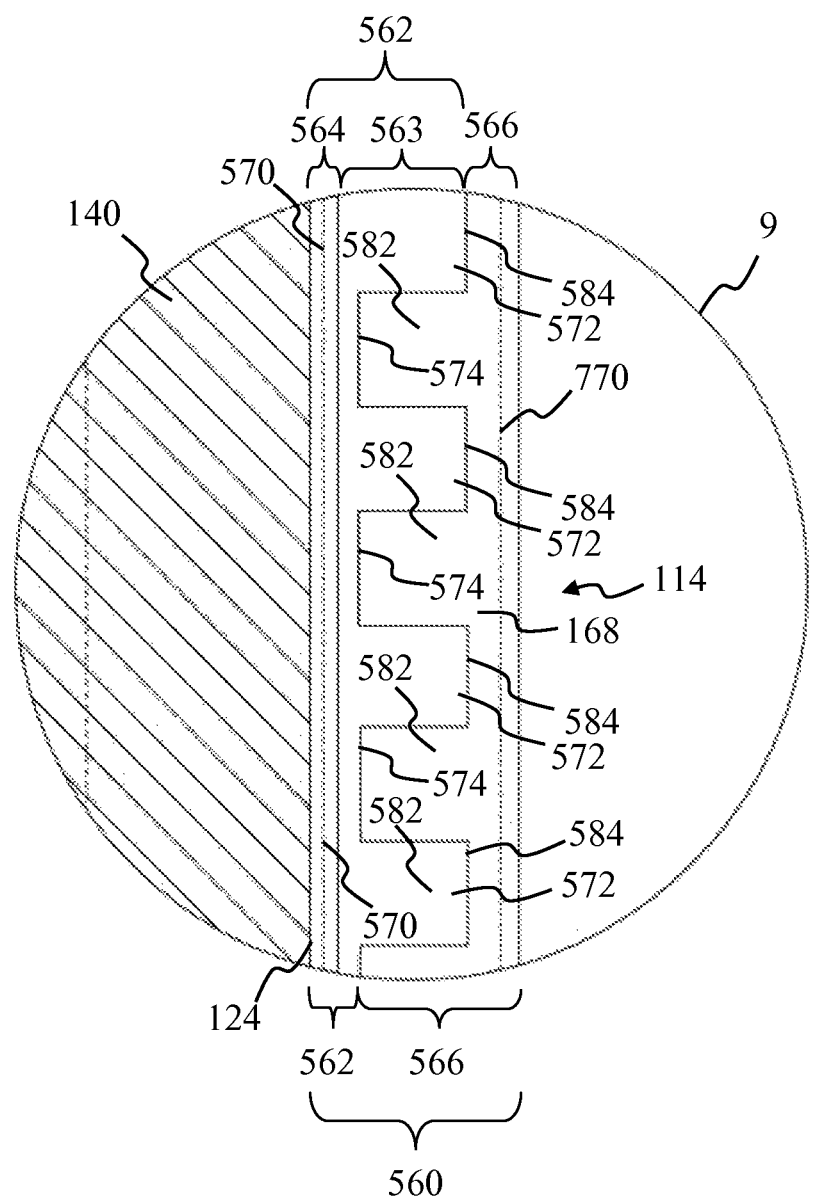
FIG. 11 shows a close-up cross-section of an embodiment of coating 560 according to the invention that can be used on building panel 112 of FIG. 8 instead of coating 160.

Coating 160 covers a portion of core 158 to create building panel 112 of composite building panel structure 110 according to the invention as shown in FIG. 1 and FIG. 6 through FIG. 8. Coating 160 creates an outer surface on building panel 112 that is ready to accept exterior or interior finishing as desired and also contributes to the strength of building panel 112. FIG. 6 shows a perspective view of core 158 with coating 160 applied, creating building panel structure 110 including building panel 112 according to the invention. FIG. 7 shows horizontal cross section 7-7 of building panel 112 of FIG. 6. FIG. 8 shows vertical cross section 8-8 of building panel 112 of building structure 110 of FIG. 6. FIG. 9 and FIG. 10 show close-up cross-sections of embodiments of coating 160 taken at section 9 of FIG. 8. FIG. 11 shows a cross-section of coating 560 according to the invention that can be used on building panel 112 according to the invention in place of coating 160.

Core 158 according to the invention has a portion covered by a coating. This document provides examples of the different coatings according to the invention that can be used to coat core 158. Coating 160, coating 460 and 461, and coating 560 according to the invention are described in this document. It is to be understood that these coatings may be used interchangeably. It is to be understood that these coatings as described are examples only and many other embodiments of coating 160, 460, 461, and 560 can be formed according to the invention.

Coating 160 of FIG. 1 and FIG. 6 through FIG. 10 covers a portion of core 158. Coating 160 can cover a portion of core 158 for many different reasons. Coating 160 can cover a portion of core 158 to add strength to core 158. Coating 160 can cover a portion of core 158 to provide an aesthetically pleasing surface finish. Coating 160 can cover a portion of core 158 to provide a surface for accepting finish treatments such as paint, stucco, or other exterior finish treatments. Coating 160 can cover a portion of core 158 to create a layer of material which protects core 158 from weather, moisture, and other deteriorating elements. In some embodiments coating 160 covers exterior surfaces. In some embodiments coating 160 covers interior surfaces. In some embodiments coating 160 covers edge surfaces. Coating 160 can cover any surface of core 158 or a portion of any surface of core 158. In the embodiment shown in FIG. 1 through FIG. 10 coating 160 covers front surface 124 of core 158 to create first surface 114 of building panel 112. In the embodiment shown in FIG. 1 through FIG. 10, coating 160 covers rear surface 126 of core 158 to create second surface 116 of building panel 112. In this way building panel 112 includes core 158 and coating 160 covering at least a portion of core 158. In this way building panel 112 includes core 158 and coating 160 covering at least a portion of front surface 124 or rear surface 126 of core 158.

FIG. 9 shows a cross-section of one embodiment of coating 160 according to the invention. Coating 160 in this embodiment is formed of multiple layers. In this embodiment coating 160 forms a cementitious membrane which provides structural strength to building panel 112 as well as providing a layer impervious to water and weather, and a layer that is ready to accept final exterior or interior finishes such as paint, stucco, or other finishes. In the embodiment shown in FIG. 9 coating 160 is formed of inner scratch layer 162 and outer main brown layer 166. A scratch layer is a layer that adheres well to core 158 and provides a base for further layers, such as outer main brown layer 166, to adhere to. Inner scratch layer 162 can be formed of many different components or mixtures or layers. In some embodiment inner scratch layer 162 is formed of a plaster mixture. In some embodiments inner scratch layer 162 is formed of a gypsum plaster mixture. In some embodiments inner scratch layer 162 is formed of a cementitious mixture. In some embodiments inner scratch layer 162 includes a fiberglass mesh. In some embodiments inner scratch layer 162 includes thermal filters for fire resistance. In the embodiment of coating 160 shown in FIG. 9, inner scratch layer 162 is a cementitious mixture Inner scratch layer 162 can be any type or form of cementitious mixture. In some embodiments inner scratch layer 162 includes one or more than one piece of fiberglass mesh. In some embodiments inner scratch layer 162 is formed of multiple layers (see FIG. 10 and FIG. 11 for two examples of multiple-layer inner scratch layers).

Outer main brown layer 166 is a cementitious mixture in this embodiment. Outer main brown layer 166 can be any type of form of cementitious mixture. In some embodiments outer main brown layer 166 includes one or more than one piece of fiberglass mesh. In some embodiments outer main brown layer 166 is formed of multiple layers. In some embodiments outer main brown layer 166 includes cement, aggregate, and fiberglass mesh. In some embodiments outer main brown layer 166 includes cement, aggregate, and acrylic bonder. In some embodiments outer main brown layer 166 includes thermal filters for fire resistance. In some embodiments outer main brown layer 166 includes cement, aggregate, and fiberglass strands. In some embodiments outer main brown layer 166 includes cement, aggregate, acrylic bonder, and fiberglass mesh.

In some embodiments coating 160 is formed of a single layer. Coating 160 can be formed of many different components or mixtures or layers. In some embodiment coating 160 is formed of a plaster mixture. In some embodiments coating 160 is formed of a gypsum plaster mixture. In some embodiments coating 160 is formed of a cementitious mixture.

FIG. 10 shows a further embodiment of coating 160 according to the invention, where coating 160 includes two layers. In the embodiment shown in FIG. 10, coating 160 is formed of inner scratch layer 162 and outer main brown layer 166. In some embodiment inner scratch layer 162 is formed of a plaster mixture. In some embodiments inner scratch layer 162 is formed of a gypsum plaster mixture. In some embodiments inner scratch layer 162 is formed of a cementitious mixture. In some embodiments inner scratch layer 162 includes a fiberglass mesh.

In the embodiment of coating 160 shown in FIG. 10, inner scratch layer 162 is a cementitious mixture that can be formed from many different components. In some embodiments inner scratch layer 162 is formed of cement, aggregate, and an acrylic bonder. In some embodiments inner scratch layer 162 includes a wire mesh embedded in the cementitious mixture. In some embodiments inner scratch layer 162 is formed of other components. Further embodiments of inner scratch layer 162 will be discussed shortly.

Outer main brown layer 166 can be formed of many different components or mixtures or layers. In some embodiment outer main brown layer 166 is formed of a plaster mixture. In some embodiments outer main brown layer 166 is formed of a gypsum plaster mixture. In some embodiments outer main brown layer 166 is formed of a cementitious mixture. In the embodiment of coating 160 shown in FIG. 10, outer main brown layer 166 is formed of brown mixture 168 and fiberglass mesh 170 embedded in brown mixture 168 while brown mixture 168 is still wet. Brown mixture 168 can take many different forms. In some embodiment brown mixture 168 is formed of a plaster mixture. In some embodiments brown mixture 168 is formed of a gypsum plaster mixture. In some embodiments brown mixture 168 is formed of a cementitious mixture. In the embodiment of coating 160 shown in FIG. 10, brown mixture 168 is a cementitious mixture made of cement, aggregate, acrylic bonder, and fiberglass strands. Brown mixture 168 components in this embodiment are mixed together with water to form a cementitious mixture, and applied over inner scratch layer 162. Often brown mixture 168 is trowelled onto inner scratch layer 162. Fiberglass mesh 170 is embedded in brown mixture 168 while it is still wet. In this way building panel 112 includes core 158, and coating 160 covering a portion of core 158, where coating 160 includes inner scratch layer 162 and outer main brown layer 166. Outer main brown layer 166 includes brown mixture 168 comprising cement, aggregate, acrylic bonder, and fiberglass strands; and fiberglass mesh 170. In some embodiments the aggregate in brown mixture 168 includes sand. In some embodiments the aggregate in brown mixture 168 includes perlite. In some embodiments the aggregate in brown mixture 168 includes vermiculite. Perlite and vermiculite improve the fire-resistant qualities of building panel 112. Therefore perlite and/or vermiculite are used as aggregate in situations where a building panel structure 110 or a building panel 112 is required to possess stringent fire-resistant capabilities. In a particular embodiment brown mixture 168 is made by mixing together:

90 pounds of Portland cement (type 1 and 2)
   90 pounds of 20 grit silica sand
   90 pounds of 30 grit silica sand
   1½ gallons of acrylic bonder, such as AC-100 from Dryvit
   3 pounds of ¾" fiberglass strands
   2½ gallons of potable water.

In this embodiment the brown mixture 168 aggregate is made of two sizes of sand, 20 grit sand and 30 grit sand. It is to be understood that larger or smaller batches can be made by increasing or decreasing the ingredient measurements proportionately. Fiberglass mesh 170 is embedded into brown mixture 168 as brown mixture 168 is applied to inner scratch layer 162 and while brown mixture 168 is still wet. This mixture has been found to provide superior structural integrity, water and weather protection, and a surface optimum for applying further finish coatings if desired. It is to be understood that brown mixture 168 can be made from other ingredients for specific structural uses.

Inner scratch layer 162 can be formed of many different components. In some embodiments inner scratch layer 162 is a cementitious mixture applied over a wire mesh. In some embodiments inner scratch layer 162 is made up of multiple layers. In the embodiment of coating 160 shown in FIG. 10, inner scratch layer 162 is formed of two layers, first scratch layer A 164 and second scratch layer B 163. First scratch layer A 164 is a "dash" scratch coat which in this embodiment is machine sprayed onto core 158. In some embodiments first scratch layer A 164 is applied using other means.

First scratch layer A 164 can be formed of many different components or mixtures or layers. In some embodiment first scratch layer A 164 is formed of a plaster mixture. In some embodiments first scratch layer A 164 is formed of a gypsum plaster mixture. In some embodiments first scratch layer A 164 is formed of a cementitious mixture. In some embodiments first scratch layer A 164 includes a fiberglass mesh. In the embodiment of coating 160 shown in FIG. 10, First scratch layer A 164 is a cementitious mixture made of cement, aggregate, and acrylic bonder. In some embodiments the aggregate includes sand. In some embodiments the aggregate includes perlite. In some embodiments the aggregate includes vermiculite. In a specific embodiment first scratch layer A 164 is formed by mixing together:

90 pounds of Portland cement (type 1 and 2)
   90 pounds of 20 grit silica sand
   90 pounds of 30 grit silica sand
   2½ gallons of acrylic bonder, such as AC-100 from Dryvit.
   2½ gallons of potable water.

In this embodiment the first scratch layer A 164 aggregate is made of two sizes of sand, 20 grit sand and 30 grit sand. This first scratch layer A 164 mixture has been found to adhere well to EPS foam block and provide a superior surface for accepting further layers of coating 160. It is to be understood that larger or smaller amounts of first scratch layer A 164 can be made by proportionately increasing or decreasing the ingredients. In some embodiments first scratch layer A 164 has other ingredients and proportions. Usually first scratch layer A 164 is allowed to cure (dry) before adding other layers.

Second scratch layer B 163 can be formed of many different components or mixtures or layers. In some embodiment second scratch layer B 163 is formed of a plaster mixture. In some embodiments second scratch layer B 163 is formed of a gypsum plaster mixture. In some embodiments second scratch layer B 163 is formed of a cementitious mixture. In some embodiments second scratch layer B 163 includes a fiberglass mesh. In the embodiment of coating 160 shown in FIG. 10, second scratch layer B 163 is formed of brown mixture 165 and fiberglass mesh 170. Fiberglass mesh 170 is embedded in brown mixture 165 while brown mixture 165 is being trowelled or otherwise applied to first scratch layer A 164 and while brown mixture 165 is still wet. Brown mixture 165 can be trowelled onto the surface of first scratch layer A 164 or applied by any other means which will allow brown mixture 165 to cover first scratch layer A and mesh 170 to be embedded into brown mixture 165.

Brown mixture 165 can be formed of many different components or mixtures or layers. In some embodiment brown mixture 165 is formed of a plaster mixture. In some embodiment brown mixture 165 is the same mixture as brown mixture 168. In some embodiments brown mixture 165 is formed of a gypsum plaster mixture. In some embodiments brown mixture 165 is formed of a cementitious mixture. In some embodiments brown mixture 165 includes a fiberglass mesh. In the embodiment of coating 160 shown in FIG. 10, brown mixture 165 is a cementitious mixture made of cement, aggregate, acrylic bonder, and fiberglass strands. Brown mixture 165 components are mixed together with water to form a cementitious mixture, and applied to first scratch layer A 164 after first scratch layer A has cured. In some embodiments the aggregate in brown mixture 165 includes sand. In some embodiments the aggregate in brown mixture 165 includes perlite. In some embodiments the aggregate in brown mixture 165 includes vermiculite. In a particular embodiment brown mixture 165 is made by mixing together:

90 pounds of Portland cement (type 1 and 2)
 90 pounds of 20 grit silica sand
 90 pounds of 30 grit silica sand
 1½ gallons of acrylic bonder, such as AC-100 from Dryvit
 3 pounds of ¾" fiberglass strands
 2½ gallons of potable water.

In this embodiment the brown mixture 165 aggregate is made of two sizes of sand, 20 grit sand and 30 grit sand. It is to be understood that larger or smaller batches can be made by increasing or decreasing the ingredient measurements proportionately. Fiberglass mesh 170 is embedded into brown mixture 165 while brown mixture 165 is still wet. This mixture has been found to provide superior structural integrity, water and weather protection, and a surface optimum for applying outer main brown layer 166. It is to be understood that brown mixture 165 can be made from other ingredients for specific structural uses. Usually second scratch layer B 163 is allowed to cure before adding other layers on top.

Coating 160, inner scratch layer 162, and outer main brown layer 166 can be made with many different thicknesses, depending on the specific use of building panel 112 and the structural strength needed. In some embodiments additional layers of inner scratch layer 162 and/or outer main brown layer 166 are added for additional strength. In some embodiments other layers are added. It is to be understood that finishing coatings are often applied to coating 160. These finishing coatings are applied for differing interior and exterior surface aesthetics and include paint, stucco, and other finishing layers and coatings.

In the embodiment shown in FIG. 10, inner scratch layer 162 is formed to be about ⅛" thick. Outer main brown layer 166 is formed to be about ¼" thick. When these layers cure, coating 160 provides a smooth surface for applying finish coatings, and is structurally very strong, energy efficient, and lightweight. Composite building panel 112 with core 158 and coating 160 has greater flex strength and shear strength than other block panels due to the structured composite layers of core 158 and coating 160. This specific embodiment is used for walls, roofs, and beams of buildings and structure. Additional layers and other thicknesses can be used according to the invention for building panel 112 to achieve different panel strengths and uses.

In some embodiments control joints are cut into core 158 before coating 160 is applied. Holes and openings for windows and doors, access channels, and passageways for facilities and air handling can be cut into core 158 to create building panel 112 of a size and shape for the structure to be built. Core 158 and coating 160 can be easily formed into any size and shape structure, resulting in a lightweight, energy efficient, strong building panel 112.

FIG. 11 shows an embodiment of coating 560 according to the invention used on building panel 112 in place of coating 160. Coating 560 can cover a portion of core 158 instead of coating 160. Coating 560 is similar to coating 160 except that in coating 560, inner scratch layer 562 and outer main brown layer 566 are interdigitated, as shown in FIG. 11. Interdigitated means that inner scratch layer 562 and outer main brown layer 566 each have crests and valleys which interlock with each other Inner scratch layer 562 and outer main brown layer 566 are interdigitated for a number of reasons. Forming inner scratch layer 562 with crests 572 and valleys 574 allows inner scratch layer 562 to be used as a screed for outer main brown layer 566. This helps to keep the thickness of coating 560 uniform across building panel 112. In addition, interdigitating inner scratch layer 562 and outer main brown layer 566 adds to the strength and structural integrity of building panel 112.

In the embodiment of coating 560 shown in FIG. 11, coating 560 includes inner scratch layer 562, where inner scratch layer 562 includes two layers, first scratch layer A 564 and second scratch layer B 563. First scratch layer A 564 is a cementitious mixture that includes fiberglass mesh 570 as shown in FIG. 11. First scratch layer A 564 in some embodiments includes the same components as first scratch layer A 164 discussed earlier. In some embodiments first scratch layer A 564 has a different composition than first scratch layer A 164.

Second scratch layer B 563 is a cementitious mixture that is formed such that it includes crests 572 and valleys 574 as shown in FIG. 11. Crests 572 and valleys 574 are formed in second scratch layer B 563 by any number of methods, including trowelling second scratch layer B 563 with a shaped trowel while second scratch layer B 563 is still wet. It is to be understood, however, that crests 572 and valleys 574 can be formed in second scratch layer B 563 in many different ways. Second scratch layer B 563 is then allowed to cure (dry) before outer main brown layer 566 is applied. Outer main brown layer 566 is a cementitious mixture which in this embodiment includes fiberglass mesh 770. In some embodiments outer main brown layer 566 does not include fiberglass mesh 770. In the embodiment shown in FIG. 11, fiberglass mesh 770 is embedded in outer main brown layer 566 while outer main brown layer 566 is still wet.

Outer main brown layer 566 is applied to scratch layer 562 after scratch layer 562 has cured. Outer main brown layer 566 in this embodiment includes brown mixture 168 and fiberglass mesh 770. Brown mixture 168 of outer main brown layer 566 can be applied in many different ways, including but not by way of limitation trowelling or spraying. Brown mixture 168 in this embodiment is trowelled over scratch layer 562 such that outer main brown layer 566 fills in valleys 574 with brown mixture 168, creating outer main brown layer crests 582 and outer main brown layer valleys 584 as shown in FIG. 11. In this way inner scratch layer 562 and outer main brown layer 566 are interdigitated. Each of a plurality of crests 572 reside in a corresponding one of a plurality of valleys 584. And each of a plurality of crests 582 reside in a corresponding one of a plurality of valleys 574. It is to be understood that crests 572 and 582 can be any shape, including but not limited to half-spheres, rectangular, half-oval, triangular, or any other shape or cross-section. And it is to be understood that valleys 574 and 584 can be any shape, including but not limited to half-spheres, rectangular, half-oval, triangular, or any other shape or cross-section.

Interdigitation of scratch layer 562 and outer main brown layer 566 provides several advantages. One advantage is that interdigitation can increase the structural strength of building panel 112. Another advantage is that crests 572 in scratch layer 562 provide a screed for outer main brown layer 566. It is often difficult to maintain a uniform coating thickness across a large building panel surface. Crests 572 provide a built-in screed for outer main brown layer 566, allowing the thickness of outer main brown layer 566 and coating 560 to be uniform across a wide surface area. Fiberglass mesh 770 is embedded in outer main brown layer 566 while outer main brown layer 566 is still wet.

FIG. 6 through FIG. 8 shows building panel structure 110 according to the invention, including building panel 112. Building panel 112 includes core 158 and coating 160 covering a portion of core 158. Coating 160 can take many forms, including those shown in FIG. 9 and FIG. 10. Building panel 112 of FIG. 6 through FIG. 8 can include coating 560 of FIG. 11 instead of coating 160 (see FIG. 12 for example). Building panel 112 as shown in FIG. 6 through FIG. 8 can include any coating according to the invention to cover a portion of core 158. A building panel structure is any structure built using one or more than one building panel as an element in the structure. Building panel structure 110 in the embodiment shown in FIG. 6 through FIG. 8 includes building panel 112 and footer 190. Building panel 112 has building panel interlock element 154, which in this embodiment is building panel groove 154. Footer 190 has integral footer interlock element 194, which in this embodiment is footer tongue 194. Footer tongue 194 couples with building panel groove 154 to couple building panel 112 to footer 190. Footer interlock element 194 is integral to footer 190 because footer tongue 194 and footer 190 are one integral piece. In this embodiment footer 190 and footer tongue 194 are both made of concrete. Footer tongue 194 is poured together with footer 190 so that footer 190 and footer tongue 194 are one integral piece. Footer tongue 194 not only provides a coupling for building panel 112, footer tongue 194 also stops moisture, water, weather, and other elements from penetrating the interface between building panel 112 and footer tongue 194. In some embodiments footer 190 and footer tongue 194 are poured along the exterior edge of a structure. After building panels 112 are coupled to footer 190 to create building structure 110, even if water, moisture, or other elements penetrate the outer interface between building panel 112 and footer 190, they cannot "climb" footer tongue 194 to get to the other side of building panel 112. In this way integral footer tongue 194 provides moisture and weather protection for building panel structure 110.

Building panel interlock element 154 can take many different forms. In some embodiments building panel interlock element 154 is a building panel tongue. In some embodiments building panel interlock element 154 has a form other than a tongue or a groove. In some embodiments building panel groove 154 or footer tongue 194 have barbs, spikes, hooks or other surface effects which help to hold footer tongue 194 in building panel groove 154.

Footer interlock element 194 can take many different forms. In some embodiments footer interlock element 194 is a footer groove. In some embodiments footer interlock element 194 takes a form other than a tongue or a groove.

In the embodiment shown in FIG. 6 through FIG. 8, building panel structure 110 is constructed by first pouring concrete footer 190, including integral footer tongue 194, as a single pour. In some embodiments footer 190 is poured in multiple pours. Footer 190 and footer tongue 194 are formed using any method which results in footer 190 and footer tongue 194 being one integral concrete piece. Concrete foundation 192 is often poured next. In some embodiments concrete foundation 192 and concrete footer 190 are formed at the same time in one concrete pour. Building panel 112 is coupled to footer 190 using footer tongue 194 and building panel groove 154. Building panel 112 can be constructed and coupled to footer 190 in many different ways. In this embodiments building panel 112 is constructed on-site and on footer 190. Core 158 is built on footer 190 and connected to footer 190. In this embodiment frame 130 is built and connected to footer 190 using bolts 188 as shown in FIG. 6. Shaped blocks 140 of core 158 are coupled to frame 130, to each other, and to footer tongue 194 to create core 158 coupled to footer 190 using footer tongue 194 and building panel groove 154. Coating 160 is applied to a portion of core 158. In this embodiment coating 160 is applied to front surface 124 of core 158 to create first surface 114 of building panel 112, and coating 160 is applied to rear surface 126 of core 158 to create second surface 116 of building panel 112 as shown. In some embodiments coating 160 is applied to core 158 and footer 190.

Building panel 112 in this embodiment has coating 160 applied to two surfaces, front surface 124 and rear surface 126, of core 158. In some embodiments coating 160 is applied to only one surface of core 158. In some embodiments coating 160 is applied to all surfaces of core 158. Coating 160 can be applied to any surface or portion of core 158 to create building panel 112 according to the invention. In some embodiments of building panel 112 and/or building panel structure 110, coating 560 as shown in FIG. 11 is used instead of coating 160. In some embodiments of building panel 112 and/or building panel structure 110, a different coating according to the invention is used instead of coating 160

In some embodiments of building panel structure 110, core 158 is built and covered with coating 160 to create building panel 112 before being coupled to footer 190. In some embodiments building panel 112 is made off-site and shipped to the building site to be coupled to footer 190.

In the embodiment shown in FIG. 6, building panel 112 is made in-place on footer 190 as described above. Multiple building panels 112 can be added to composite building panel structure 110 to create walls, ceilings, floors, beams, bridges, of any other desired structure. In this embodiment composite building panel 112 forms part of building panel structure 110 which is a wall. In other embodiments building panel 112 forms parts of other structures and buildings in accordance with building panel structure 110. In some embodiments building panel structure 110 is a building. In other embodiments building panel structure 110 is a bridge. In some embodiments building panel structure 110 is a structure. Building panel structure 110 is any building, structure, or edifice of any shape, size or use which is formed of at least one building panel according to the invention.

Building panel structure 110 as shown in FIG. 6 through FIG. 8 is structurally sound as soon as coating 160 dries, and there is no need for external structural elements to hold building panel 112 in place while the rest of building panel structure 110 is created. In other types of foam block panel construction, for example, the foam block walls cannot support themselves until the entire structure is created and fitted together. The walls need to be supported by external structural elements during construction. These external structural elements used to hold the structure together during construction are not necessary when using building panel 112 according to the invention. Building panels 112 formed each day as part of building panel system 110 are structural sound and secure as soon as coating 160 dries, and each day whatever part of the complete structure has been completed is strong and secure and not in danger of collapsing.

Building panel 112 in this embodiment is stronger than other types of foam block walls. Core 158 and coating 160 give building panel structure 110 the strength to both hold building panel 112 secure during construction and withstand strong environmental elements and forces during the lifetime of the building, such as wind and earth movement. Building panel 112 is environmentally friendly, creating an energy efficient structure using recyclable material with less waste.

Figure 12:
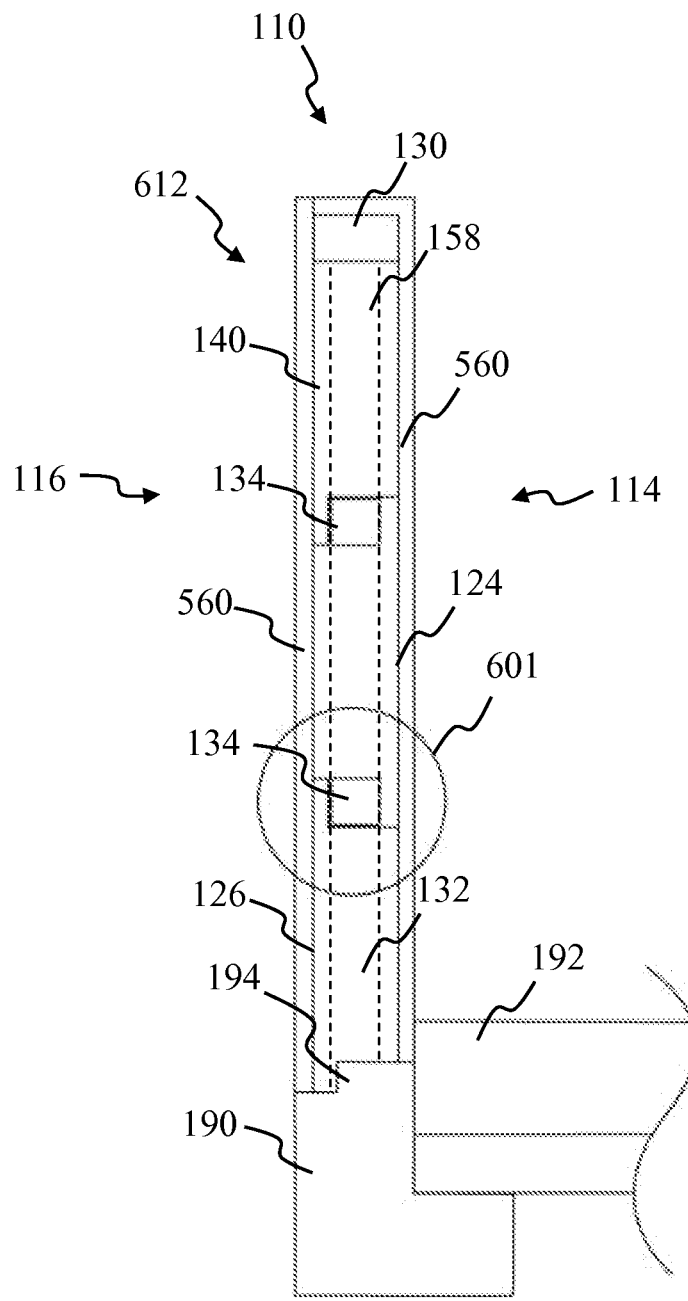
FIG. 12 shows a vertical cross section of an embodiment of building panel structure 110 according to the invention, which includes building panel 612 according to the invention.

FIG. 12 shows a further embodiment of building panel structure 110, where building panel structure 110 includes building panels 612 and footer 190. Building panel 612 includes core 158 and coating 560 covering a portion of core 158. Building panel structure 110 of FIG. 12 is similar to building panel structure 110 shown in FIG. 6 through FIG. 8 except in the embodiment shown in FIG. 12, building panels 612 use coating 560 (FIG. 11) instead of coating 160, and footer tongue 194 is shaped differently than what is shown in FIG. 8. Otherwise the description above of building panel structure 110 of FIG. 6 through FIG. 8 applies also to building panel structure 110 of FIG. 12.

Building panel structure 110 according to the invention of FIG. 12 includes building panel 612. Building panel 612 includes core 158 and coating 560 covering a portion of core 158. Coating 560 can take many forms, including the embodiments shown in FIG. 11, FIG. 20, and FIG. 21. Building panel 612 of FIG. 12 can include coating 160 of FIG. 1 through FIG. 10 instead of coating 560 Building panel 612 as shown in FIG. 12 can include any coating according to the invention to cover a portion of core 158. In some embodiments of building panel 612 and/or building panel structure 110, a different coating according to the invention is used instead of coating 560.

Building panel 612 in this embodiment has coating 560 applied to two surfaces, front surface 124 and rear surface 126, of core 158. In some embodiments coating 560 is applied to only one surface of core 158. In some embodiments coating 560 is applied to all surfaces of core 158. Coating 560 can be applied to any surface or portion of core 158 to create building panel 612 according to the invention.

Building panel structure 110 as shown in FIG. 12 is structurally sound as soon as coating 560 dries, and there is no need for external structural elements to hold building panel 612 in place while the rest of building panel structure 110 is created. Building panels 612 formed each day as part of building panel system 110 are structural sound and secure as soon as coating 560 dries, and each day whatever part of the complete structure has been completed is strong and secure and not in danger of collapsing.

Building panel 612 in this embodiment is stronger than other types of foam block walls. Core 158 and coating 560 give building panel structure 110 the strength to both hold building panel 612 secure during construction and withstand strong environmental elements and forces during the lifetime of the building, such as wind and earth movement. Building panel 612 is environmentally friendly, creating an energy efficient structure using recyclable material with less waste.

Building panels 612 can be used to form a wall, a floor, a roof, ceiling or any other part of a building or other building panel structure 110. Building panel 612 as part of building panel structure 110 according to the invention can be a complete building or a part of a building. Building panel 612 as part of building panel structure 110 can form part of a bridge, a fence, or other structure.

Building panel 612 of FIG. 12 includes one or more than one embodiment of a coating/frame coupler according to the invention. FIG. 13 through FIG. 20 show example embodiments of coating/frame coupler 102, 202, 302, or 602 used as a part of building panel 612 of FIG. 12.

A coating/frame coupler according to the invention is used to ensure building panel 612 will not fall apart in extreme conditions such as a fire. Some embodiments of insulating structural block 140 do not maintain their form, strength, or integrity in extreme conditions. EPS blocks 140, for example, will melt in a fire. Some blocks 140 made of straw or plastic will also melt in a fire or other extreme temperatures. It is desirable to have building panel 612 and building panel structure 110 maintain its form, strength, and integrity in extreme conditions such as a fire. It is not desirable, for example, for coatings 160, 460, or 560 to separate from core 158 in extreme conditions. If core 158 and coatings 160, 460, or 560 separate, coatings 160, 460, or 560 can fall on firemen or building occupants and cause further damage. It is desirable for coatings 160, 460, or 560 to remain coupled to core 158 even if insulating structural blocks 140 melt or are otherwise compromised in extreme conditions. A coating/frame coupler according to the invention accomplishes this task.

The coating/frame coupler holds the coating in a fixed spaced relationship with respect to the frame. The building panel is formed using the coating/frame coupler so that the building panel includes a rigid skeleton in the form of the frame, and a rigid coating coupled to the frame with the coating/frame coupler. The insulating structural blocks provide superior insulating capability as well as giving the building panel the proper shape. But if the insulating structural blocks are melted, moved or damaged at any time during the life of the building panel, it is desirable for the building panel structure in the form of the frame and the rigid coating to maintain its shape, strength, and form. The coating/frame coupler attaches the coating to the frame in a rigid manner so that the coating is strongly coupled to the frame whether the blocks are there or not. Thus in a fire, for example, if the EPS foam blocks melt, the coating remains coupled to the frame, the coating remains in place, and the building panel structure remains structurally sound.

Figure 13:
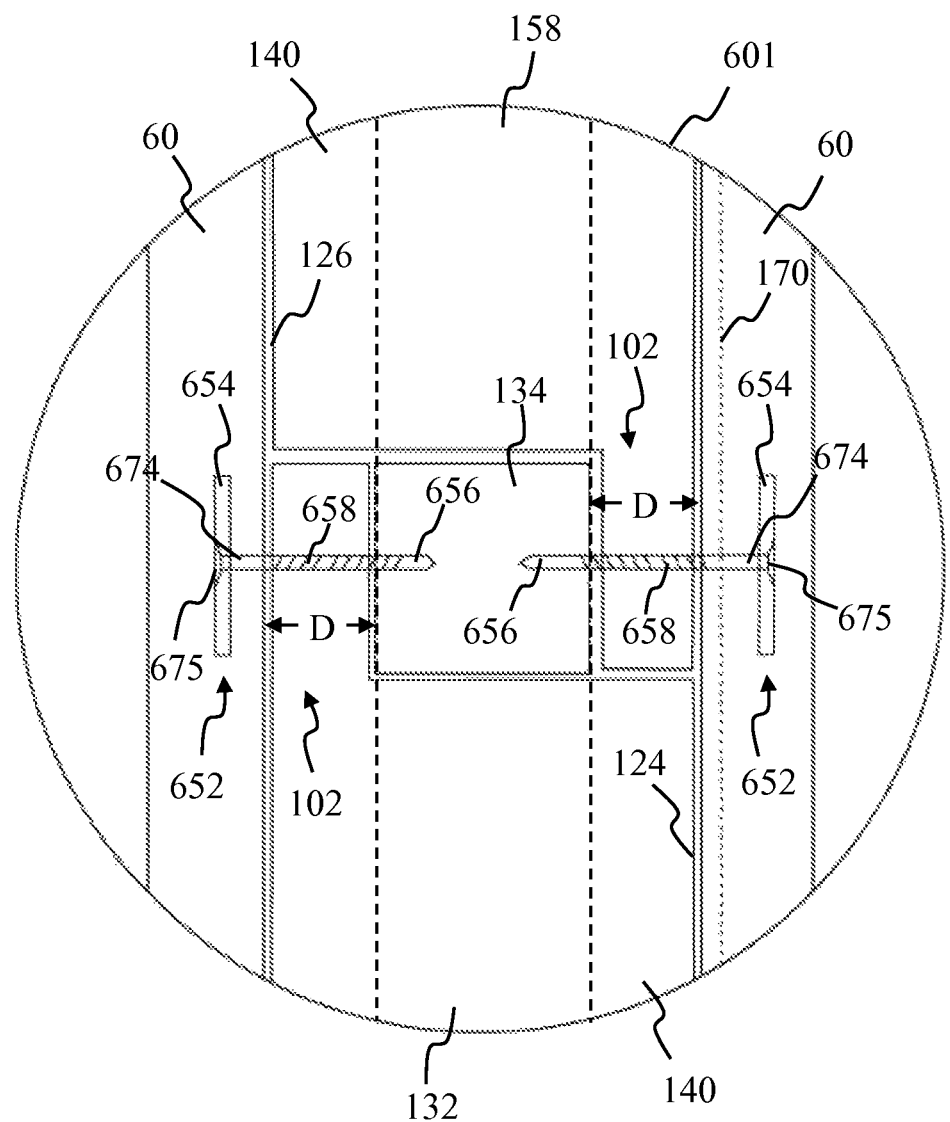
FIG. 13 shows a close-up view of area 601 of FIG. 12, showing two embodiments of coating/frame coupler 102 according to the invention.
Figure 14:
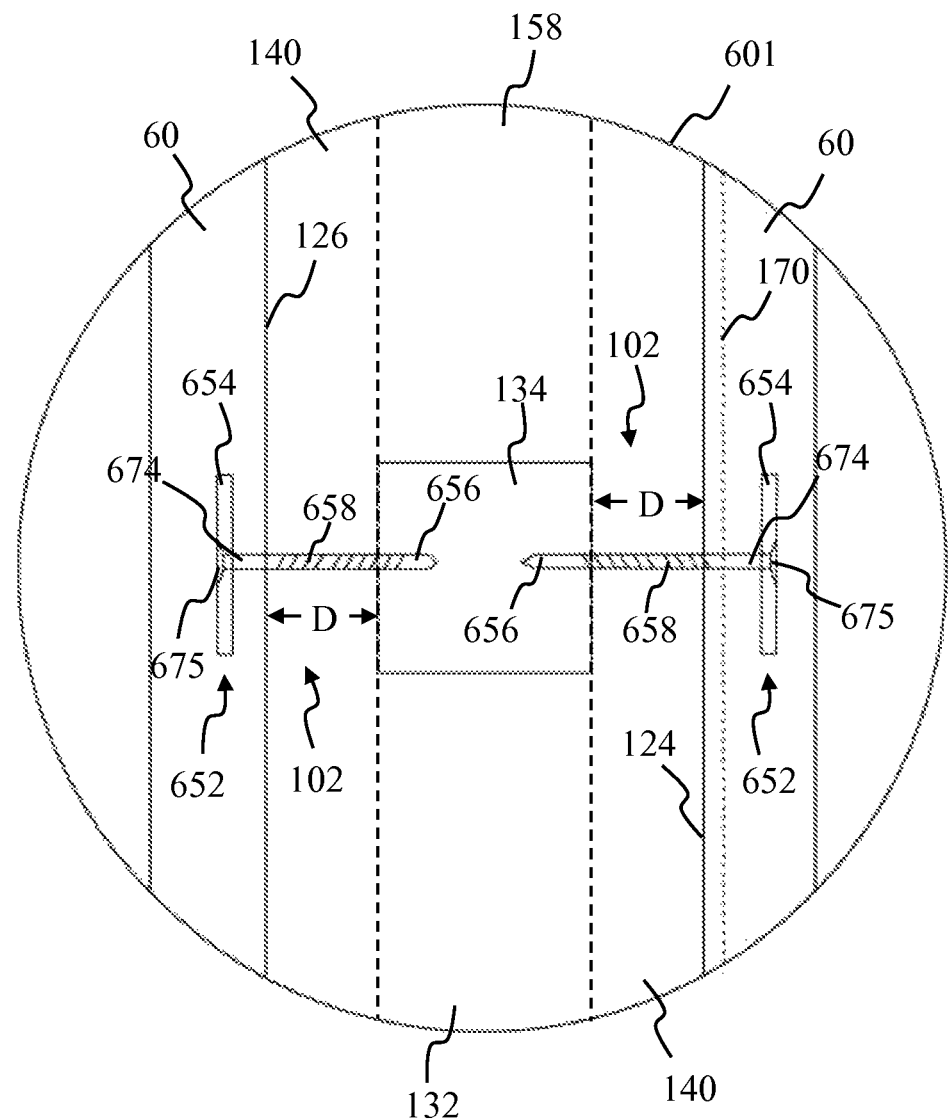
FIG. 14 shows coating/frame couplers 102 of FIG. 13 when blocks 140 are gone, for example if they have melted due to a fire.
Figure 15:
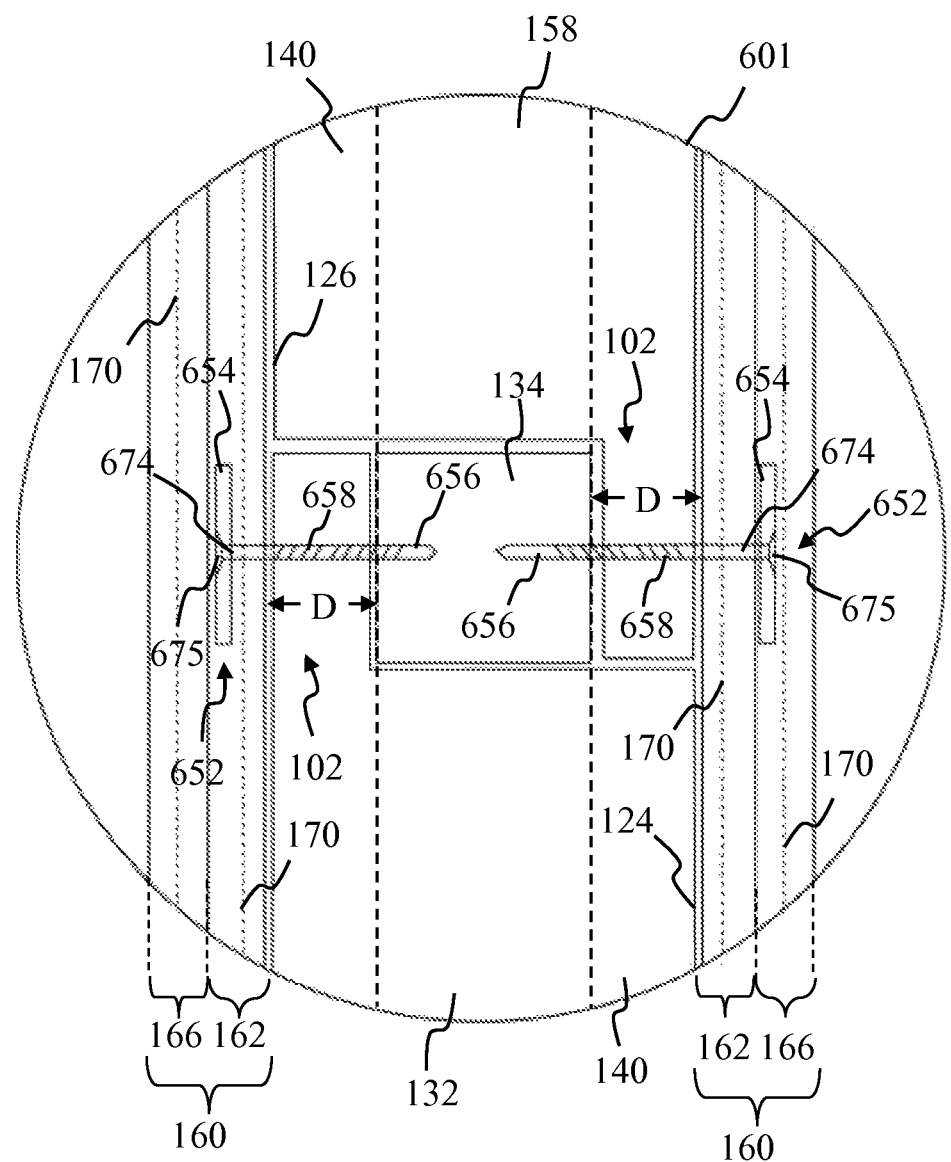
FIG. 15 shows a close-up view of area 601 of FIG. 12, showing two further embodiments of coating/frame coupler 102 according to the invention.
Figure 16:
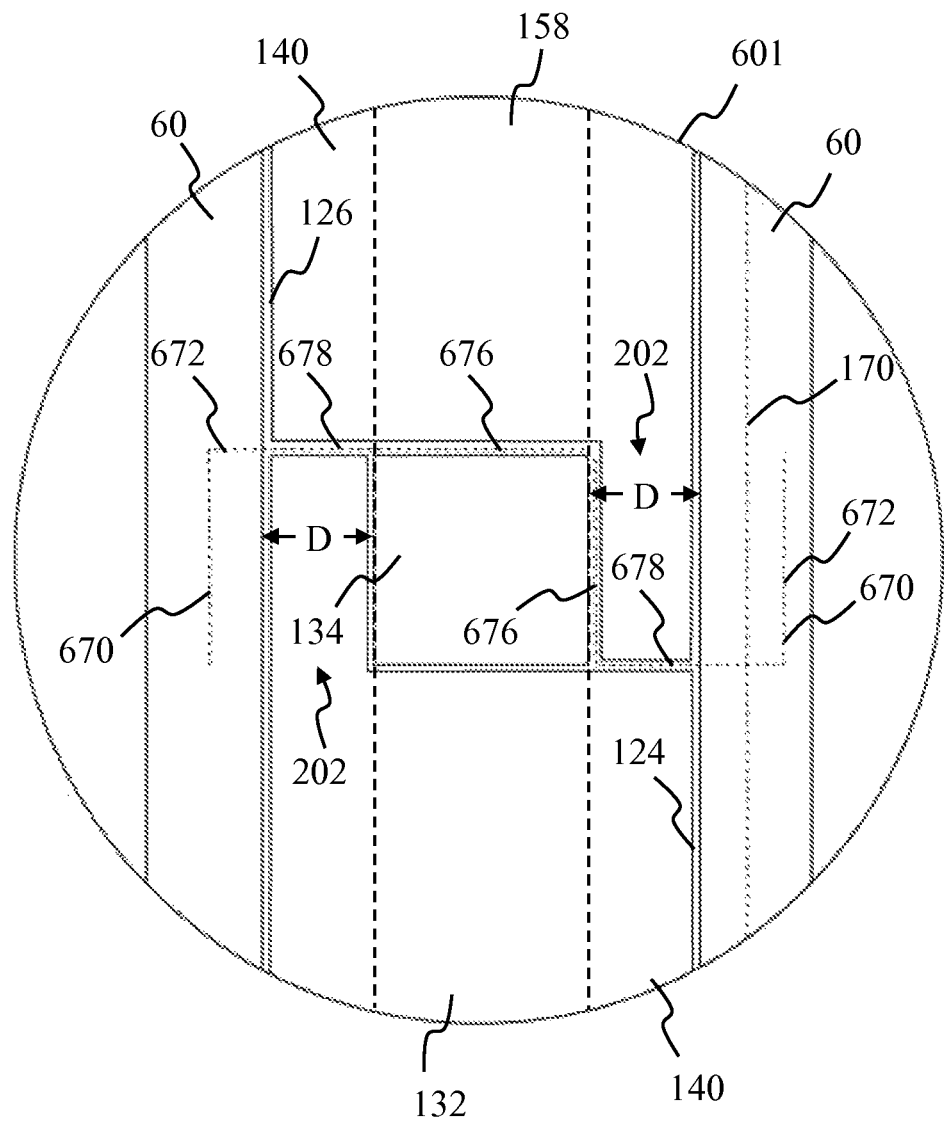
FIG. 16 shows a close-up view of area 601 of FIG. 12, showing two embodiments of coating/frame couplers 202 according to the invention.
Figure 17:
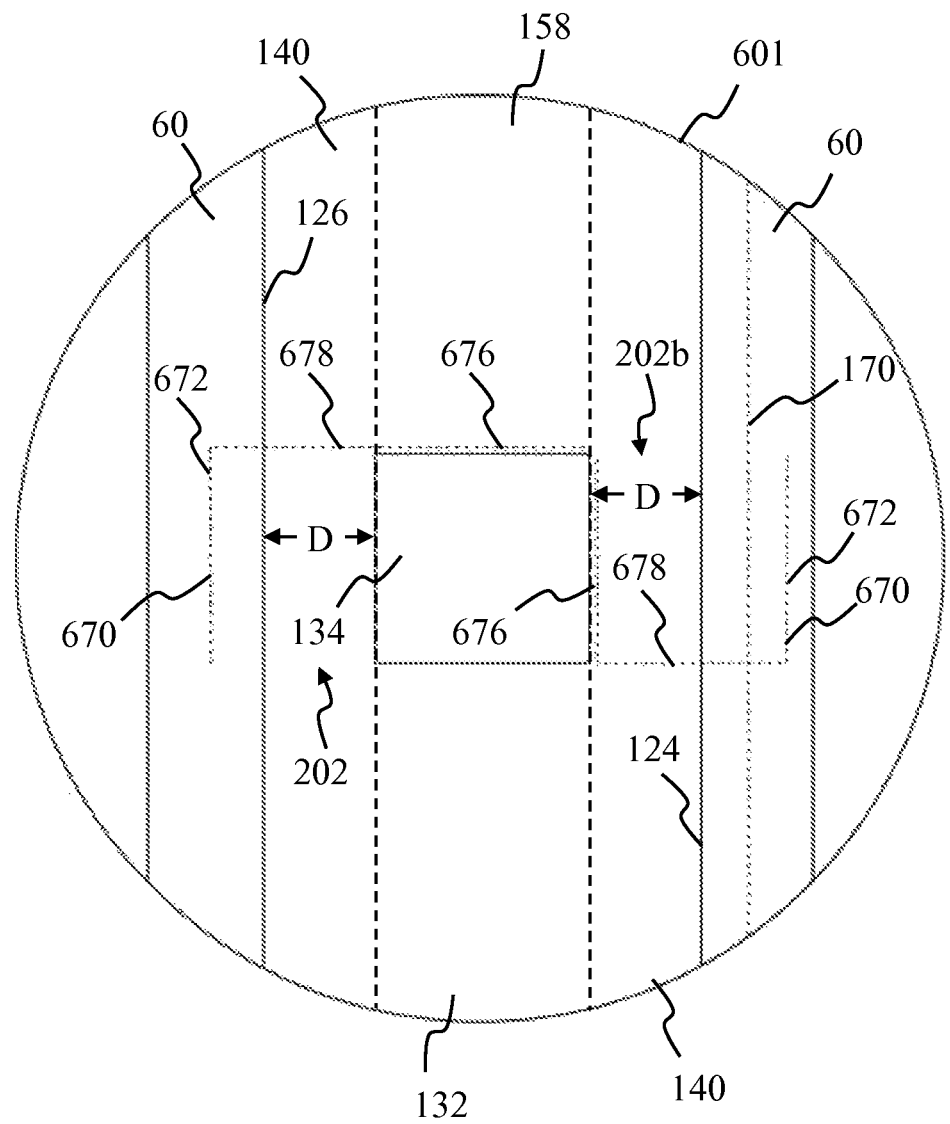
FIG. 17 shows coating/frame couplers 202 of FIG. 16 when blocks 140 are gone, for example if they have melted due to a fire.
Figure 18:
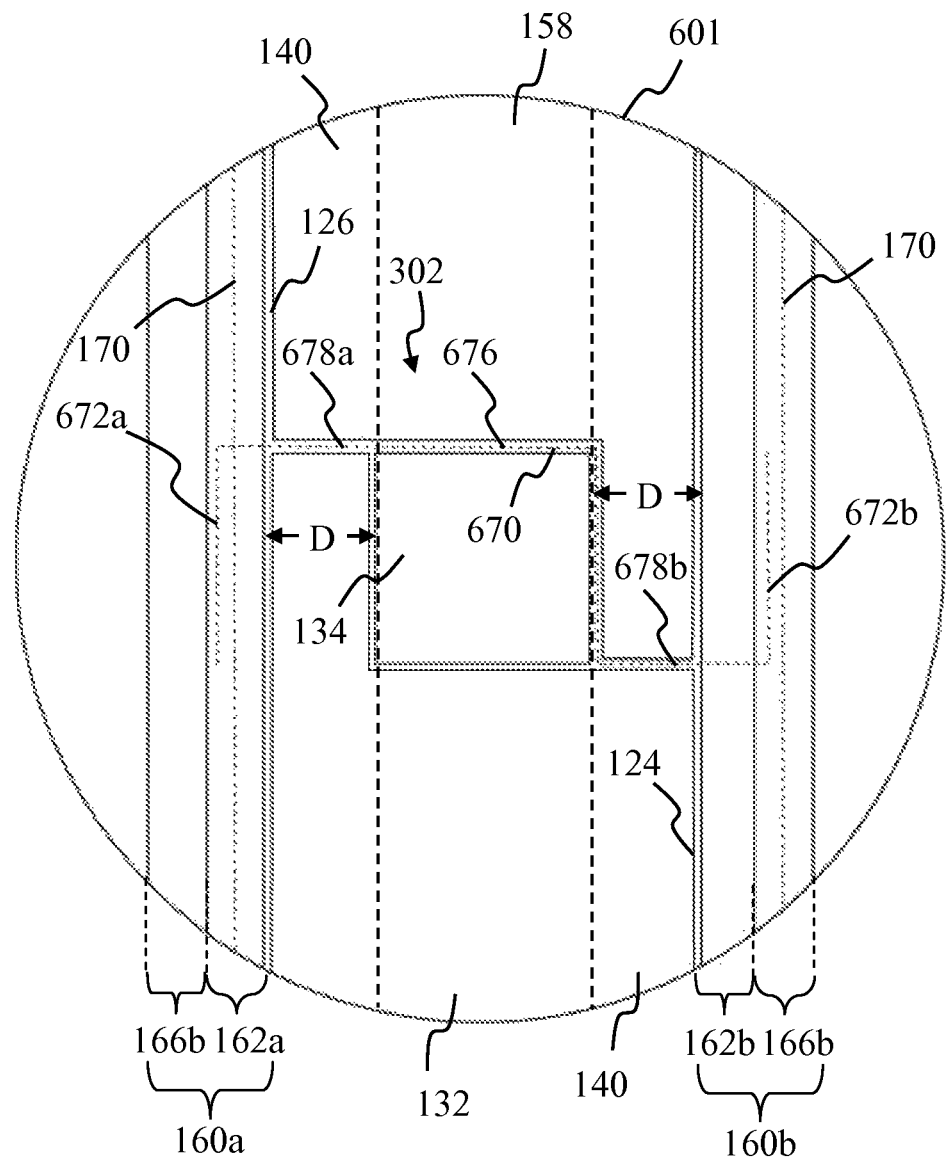
FIG. 18 shows a close-up view of area 601 of FIG. 12, showing an embodiment of coating/frame coupler 302 according to the invention.
Figure 19:
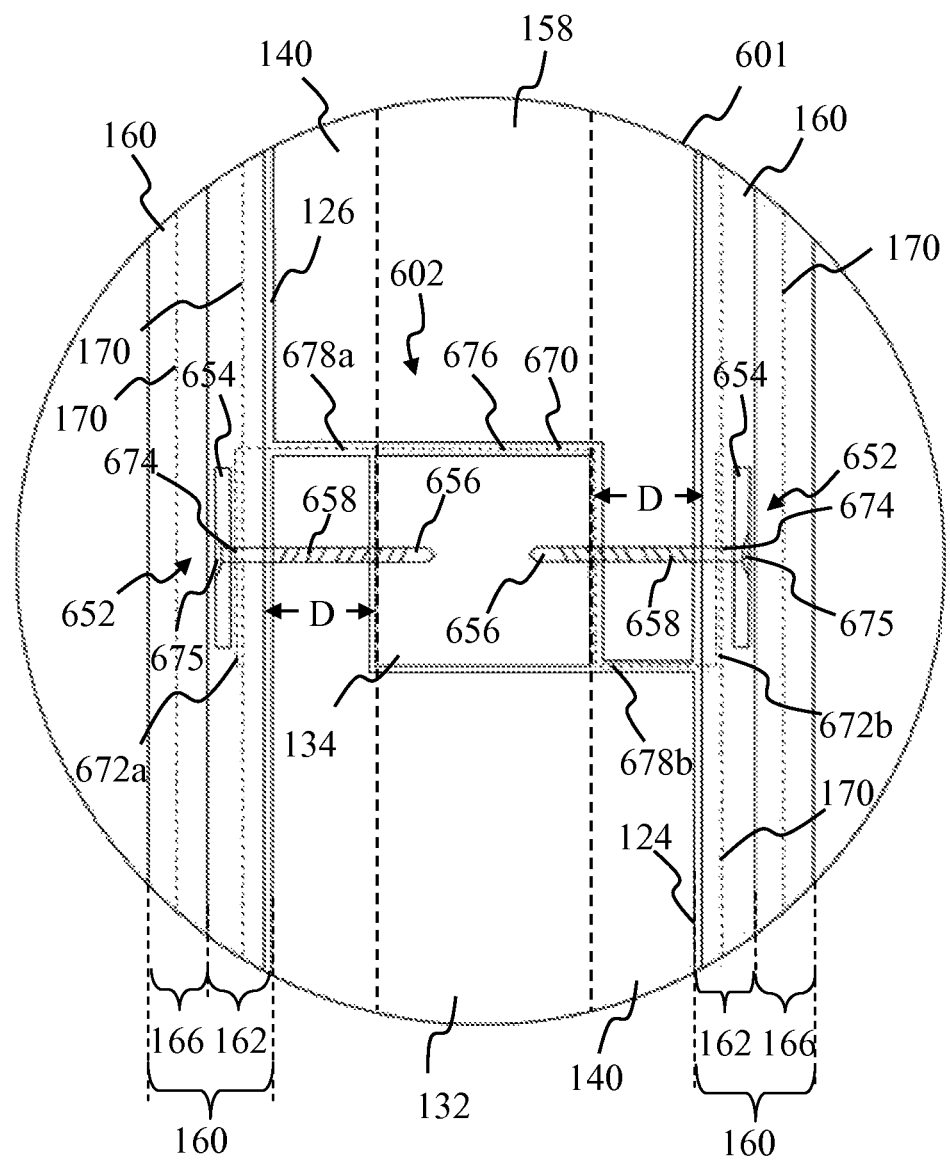
FIG. 19 shows a close-up view of area 601 of FIG. 12, showing an embodiment of coating/frame coupler 602 according to the invention.
Figure 20:
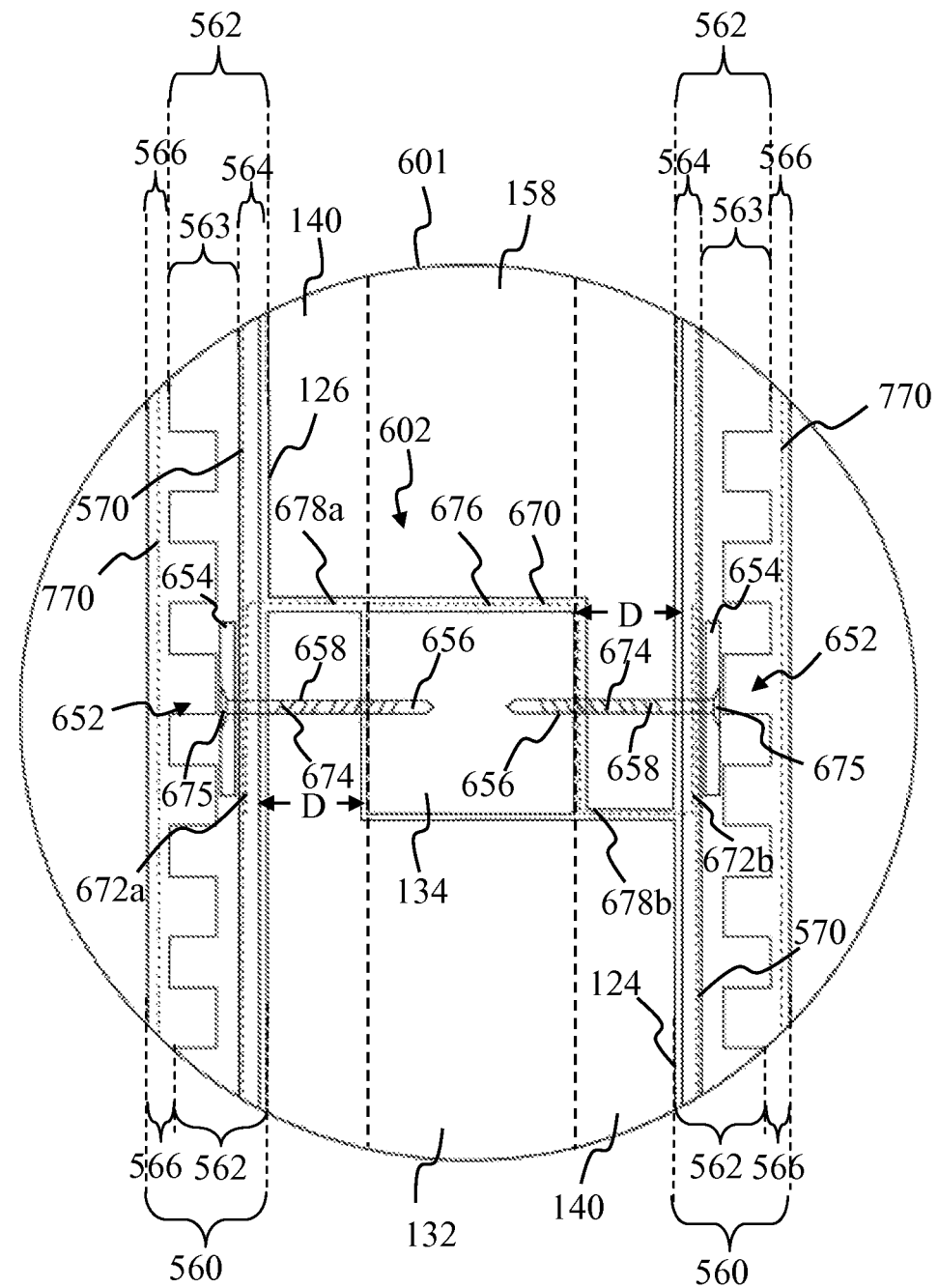
FIG. 20 shows a close-up view of area 601 of FIG. 12, showing another embodiment of coating/frame coupler 602 according to the invention.
Figure 21:
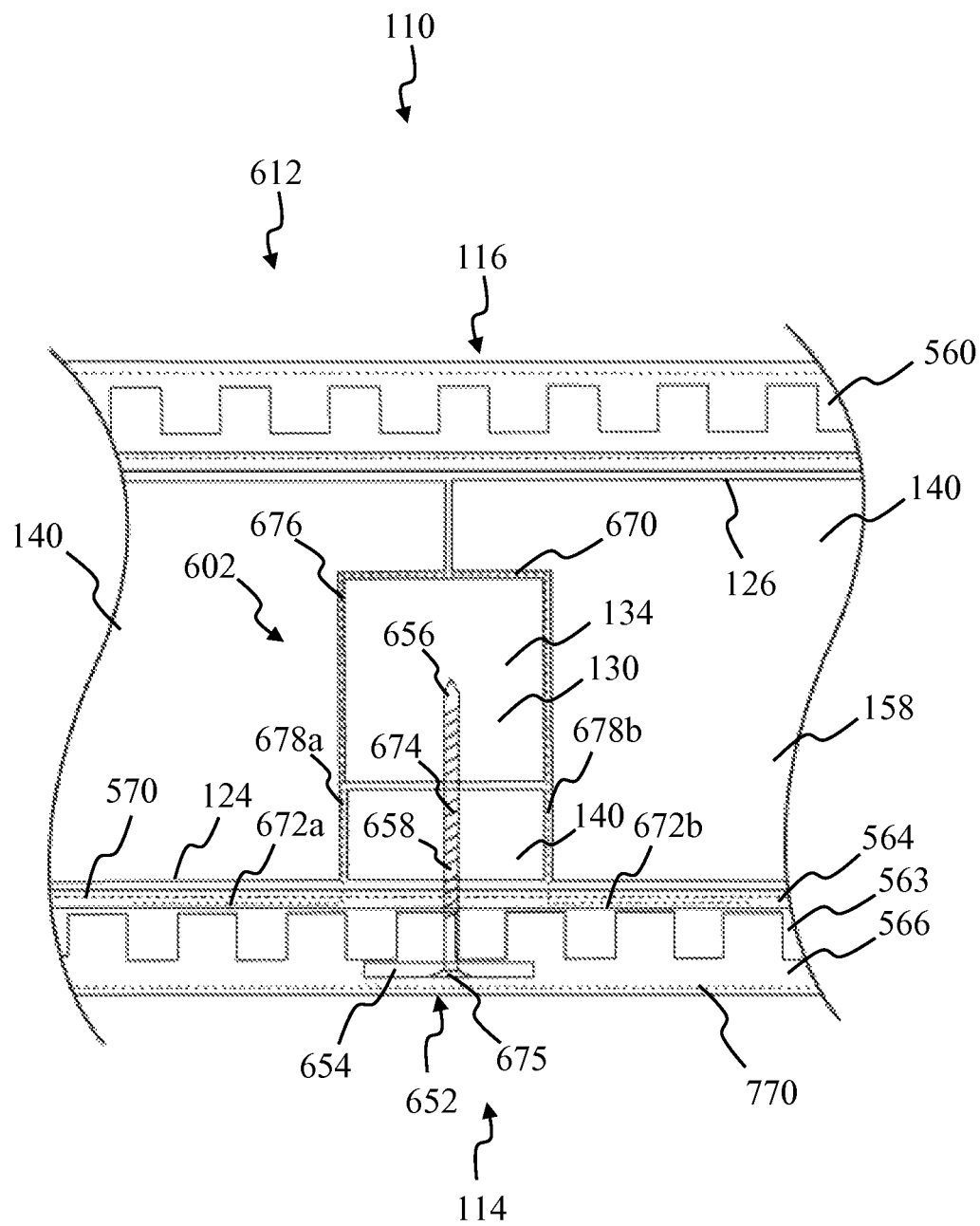
FIG. 21 shows a cross-section of an embodiment of building panel 612 according to the invention, showing a further embodiment of coating/frame coupler 602 according to the invention.

FIG. 13 through FIG. 21 show embodiments of coating/frame couplers 102, 202, 302, and 602 according to the invention. FIG. 13 through FIG. 15 show embodiments of coating/frame coupler 102 according to the invention used in building panel structure 110 of FIG. 12. FIG. 16 and FIG. 17 show embodiments of coating/frame coupler 202 according to the invention used in building panel structure 110 of FIG. 12. FIG. 18 shows an embodiment of coating/frame coupler 302 according to the invention used in building panel structure 110 of FIG. 12. FIG. 19 and FIG. 20 show embodiments of coating/frame coupler 602 according to the invention used in building panel structure 110 of FIG. 12. FIG. 21 shows an embodiment of coating/frame coupler 602 according to the invention used in an additional embodiment of building panel structure 110.

A coating/frame coupler according to the invention includes a coating coupled portion, a frame-coupled portion, and an extension portion. The coating-coupled portion is fixedly coupled to the coating. The frame-coupled portion is fixedly coupled to the frame. The extension portion couples the coating-coupled portion to the frame-coupled portion. The extension portion holds the coating-coupled portion, and thus the coating, in a fixed spaced relationship with the frame-coupled portion, and thus the frame. In this way the coating/frame coupler holds the coating in a fixed spaced relationship with respect to the frame. FIG. 13 through FIG. 21 shows example embodiments of coating/frame couplers according to the invention, but it is to be understood that a coating/frame coupler according to the invention can take many forms including those shown in this document, and other forms.

FIG. 13 and FIG. 14 show an embodiment of coating/frame coupler 102 according to the invention. FIG. 13 and FIG. 14 show an enlarged cross-section of area 601 of FIG. 12, showing two coating/frame couplers 102, one on each side of building panel 612. In this embodiment coating 160 shown in FIG. 12 is replaced with coating 60 on either side of core 158. It is to be understood that in some embodiments core 158 is coated on one side only. When core 158 is coated on a single side, then only one coating/frame coupler 102 is used.

Coating 60 is a single-layer coating that can be made of any material that is strong enough to maintain its form and structure if blocks 140 melt, move, crush, or are otherwise compromised. Coating 60 can be a cementitious mixture, a plaster mixture, a gypsum plaster mixture, a plastic mixture, or any other type of coating mixture. In the embodiment shown in FIG. 13 and FIG. 14, coating 60 is a cementitious mixture. Coating 60 on front side 124 includes fiberglass mesh 170, which is embedded in coating 60 while coating 60 is still wet, as discussed earlier with regard to coating 160 and coating 560. Horizontal member 134 is a part of frame 130 of core 158. In this embodiment member 134 is a horizontal steel girder.

Coating/frame coupler 102 in this embodiment includes screw 674 and washer 654. Screw 654 is coupled to horizontal member 134 after core 158 has been constructed but before coatings 60 are applied. Screw 674 is run through washer 654 so that washer 654 is held onto screw shank 658 at screw head 675 after screw 674 is coupled to horizontal member 134. In some embodiments fiberglass mesh 170 is applied to a core surface, such as surface 124, before screw 674 is coupled to member 134. Once screw 674 is coupled to horizontal member 134 with washer 654 held in spaced relationship from horizontal member 134, coating 60 is applied such that washer 654 and screw head 675 are embedded in coatings 60. Coating 60 is allowed to cure. After coating 60 is cured, screw end 656, which comprises frame-coupled portion 656 of coating/frame coupler 102, remains securely coupled to frame 130 horizontal member 134. Screw head 675 and washer 654, which together form coating-coupled portion 652, are firmly embedded in coating 60 such that coating 60 is in a spaced relationship with respect to frame 130.

Coating/frame coupler 102 extension portion is in this embodiment screw shaft 658. Extension portion 658 holds coating-coupled portion 652 in a spaced relationship with respect to frame-coupled portion 656. In this embodiment extension portion 658 holds coating-coupled portion 652 in a spaced relationship such that coating 60 is held a distance D from horizontal member 134. After coating 60 dries, this spaced relationship between coating-coupled portion 652 and frame-coupled portion 656, and coating 60 and horizontal member 134, is maintained, even if blocks 140 are melted or otherwise disappear, as in FIG. 14. FIG. 14 shows the cross-section of building panel 612 of FIG. 13 after EPS foam blocks 140 have been melted and so are no longer in place between coating 60 and frame 130 horizontal member 134. But even though blocks 140 are gone, building panel 612 retains its structural shape, strength, and integrity because coating/frame coupler 102 holds coating 60 in a fixed spaced relationship to frame 130.

As shown in the example embodiment in FIG. 14, when blocks 140 are gone, frame-coupled portion 652 holds coating 60 in a fixed spaced relationship with frame 130 horizontal member 134. Thus coating/frame coupler 102 holds coating 60 in a fixed spaced relationship with frame 130 even if blocks 140 are not there. In this embodiment coating/frame coupler 102 is holding coating 60 in a fixed spaced relationship with frame 130 such that coating 60 is held a distance D from horizontal member 134. If blocks 140 are melted or damaged in a fire, for example, coating 60 is held a distance D from horizontal member 134. Coating 60 will not drop from frame 130 or move with respect to frame 130, but will remain in place.

It is to be understood that washer 654 and screw 674 can be replaced with any equivalent element. In some embodiments washer 654 is a disc of material with holes so that the mixture forming coating 60 can go through the holes and completely cover washer 654 during construction.

FIG. 15 shows the embodiment of coating/frame coupler 102 of FIG. 13 and FIG. 14, with coating 60 replaced by coating 160 according to the invention. Coatings 160 in this embodiment are applied to front surface 124 and back surface 126 of core 158. Coating 160 in this embodiment includes scratch layer 162, which in this embodiment includes fiberglass mesh 170. Coating 160 in this embodiment also includes outer main brown layer 166, which in this embodiment also includes a piece of fiberglass mesh 170.

Coating/frame coupler 102 holds coatings 160 in a spaced relationship with horizontal member 134 as discussed earlier. In the embodiments shown in FIG. 15, coating coupled portion 652 is embedded in different coating layers. In coating 160 on back surface 126, coating-coupled portion 652 is embedded in scratch layer 162. In coating 160 on front surface 124, coating-coupled portion 652 is embedded in outer main brown layer 166. Coating-coupled portion 652 can be embedded in any position or layer of coating 160. Coating-coupled portion 652 can be embedded on either side of fiberglass mesh 170. It is to be understood that any coating according to the invention can be substituted for coating 160. It is to be understood that coating-coupled portion 654 can be embedded in coating 160 in any position or layer.

A coating/frame coupler according to the invention can take many different forms. The embodiments shown in this document are examples only, many other types and forms of coating/frame coupler according to the invention are envisioned.

FIG. 16 and FIG. 17 show embodiments of coating/frame coupler 202, where coating/frame coupler 202 is formed of a piece of fiberglass mesh 670 that is coupled to building panel 612 coating 60 and building panel frame 130 horizontal member 134. Coating/frame coupler 202 is formed of piece of fiberglass mesh 670. Piece of fiberglass mesh 670 includes frame-coupled portion 676, coating-coupled portion 672, and extension portion 678. Coating/frame coupler 202 is formed by coupling frame-coupled portion 676 to horizontal member 134 during construction of core 158. Frame-coupled portion 676 can be coupled to horizontal member 134 in many ways, such as by using acrylic bonder and/or adhesive to bond frame-coupled portion 676 to horizontal member 134.

Coating-coupled portion 672 is embedded in coating 60 while coating 60 is still wet, as explained earlier. In embodiments where coating 160 includes fiberglass mesh 170, such as coating 60 on front surface 124 in FIG. 16, coating-coupled portion 672 can be on either side of fiberglass mesh 170. In FIG. 16 coating-coupled portion 672 is on the outer side of fiberglass mesh 170 in coating 60. In other embodiments coating-coupled portion 672 is on the inner side of fiberglass mesh 170 in coating 60. Coating-coupled portion 672 is routed to the outer side of fiberglass mesh 170 by cutting or separating fiberglass mesh 170 to allow fiberglass mesh 670 to pass through.

Extension portion 678 of coating/frame coupler 202 is formed of portion 678 of piece of fiberglass mesh 670. Extension portion 678 is made rigid by applying acrylic bonder, adhesive, resin, or other substance which will turn extension portion 678 into a rigid structure.

Once coating 60 is allowed to cure, extension portion 678 holds coating-coupled portion 672 in a spaced relationship with respect to frame-coupled portion 676. In this embodiment extension portion 678 holds coating-coupled portion 672 in a spaced relationship such that coating 60 is held a distance D from horizontal member 134. After coating 60 dries, this spaced relationship between coating 60 and horizontal member 134 is maintained even if blocks 140 are melted or otherwise disappear, as in FIG. 17. FIG. 17 shows the cross-section of building panel 612 of FIG. 16 after EPS foam blocks 140 have been melted and so are no longer in place between coating 60 and frame 130 horizontal member 134. But even though blocks 140 are gone, building panel 612 retains its structural shape, strength, and integrity because coating/frame coupler 202 holds coating 60 in a fixed spaced relationship to frame 130.

FIG. 16 and FIG. 17 shows an embodiment where two coating/frame couplers 202 are used. In this embodiment each coating/frame coupler 202 couples a coating 60 to horizontal member 134. One coating/frame coupler 202 couples coating 60 on front surface 124 to horizontal member 134, and one coating/frame coupler 202 coupled coating 60 on back surface 126 to horizontal member 134. Each coating/frame coupler 202 includes a piece of fiberglass mesh 670. One advantage of using two coating/frame couplers 202 as shown in FIG. 16 and FIG. 17 is that coating/frame couplers 202 act as a fire break, isolating the individual building panels 612 and not allowing gasses or fire to cross the border formed by coating/frame couplers 202 to the adjacent building panel 612. Thus coating/frame couplers 202 keep fire from spreading. It is to be understood that in some embodiments one of the coating/frame couplers 202 shown in FIG. 16 and FIG. 17 is eliminated. One of the coating/frame couplers 202 might be eliminated, for example, if one of the coatings 60 are eliminated.

FIG. 18 shows an embodiment of coating/frame coupler 302, where coating/frame coupler 302 includes piece of fiberglass mesh 670 that runs from front surface 124 of core 158 to rear surface 126 of core 158. Coating/frame coupler 302 couples frame 130 horizontal member 134 to coating 160b on front surface 124 of core 158. And coating/frame coupler 302 couples frame 130 horizontal member 134 to coating 160a on rear surface 126 of core 158. In this embodiment coating/frame coupler 302 includes first coating-coupled portion 672a, and second coating-coupled portion 672b. First coating-coupled portion 672a is coupled to first coating 160a on rear surface 126 of core 158. Second coating-coupled portion 672b is coupled to second coating 160b on front surface 124 of core 158. First-coating-coupled portion 672a is embedded in scratch coat 162a of coating 160a when scratch coat 162a is still wet. In this embodiment first coating-coupled portion 672a is on the outer side of fiberglass mesh 170 that is embedded in scratch layer 162a, but this is not mean to be a limitation. First coating-coupled portion 672a can be on either side of fiberglass mesh 170.

Second coating-coupled portion 672b is embedded in outer main brown layer 166b of coating 160b while outer main brown layer 166b is still wet. In this embodiment second coating-coupled portion 672b is on the inner side of fiberglass mesh 170 that is embedded in outer main brown layer 166b, but this is not mean to be a limitation. Second coating-coupled portion 672b can be on either side of fiberglass mesh 170. It is to be understood that coating 160 can be replaced with any embodiment of coating 160, coating 560, or any other rigid coating, and that coating-coupled portions 672 can be embedded in the coating in any position or layer as long as coating-coupled portion 672 is fixedly coupled to the coating.

Once coating 160 is allowed to cure, extension portions 678a and 678b hold coating-coupled portions 672a and 672b in a spaced relationship with respect to frame-coupled portion 676. In this embodiment extension portions 678a and 678b hold coating-coupled portions 672a and 672b in a spaced relationship such that coating 160 is held a distance D from horizontal member 134. After coating 160 dries, this spaced relationship between coating 160 and horizontal member 134 is maintained even if blocks 140 are melted or otherwise disappear, as discussed earlier. Even if blocks 140 are gone, building panel 612 retains its structural shape, strength, and integrity because coating/frame coupler 302 holds coating 160 in a fixed spaced relationship to frame 130. An advantage of using coating/frame coupler 302 as shown in FIG. 18 is that coating/frame coupler 302 acts as a fire break, isolating the individual building panels 612 and not allowing gasses or fire to cross the border formed by coating/frame coupler 302 to the adjacent building panel 612. Thus coating/frame coupler 302 keeps fire from spreading.

FIG. 19 shows an embodiment of coating/frame coupler 602, where coating/frame coupler 602 includes piece of fiberglass mesh 670 and screw 674 and washer 654. Coating/frame coupler 602 provides additional strength as compared to using coating/frame coupler 102, 202, or 302. Coating/frame coupler 602 is shown extending to both coating 160 on front surface 124 and to coating 160 on back surface 126. It is to be understood that in some embodiments coating/frame coupler 602 extends to only one surface and one coating of building panel 612. And it is to be understood that coating/frame coupler 602 can be used with any rigid coating that can be used instead of coating 160 (see FIG. 20 for example).

In the embodiment shown in FIG. 19, coating/frame coupler 602 includes first coating-coupled portion 672 and second coating-coupled portion 652. In the embodiment shown in FIG. 19 first coating-coupled portion 672 includes portions 672a and 672b of piece of fiberglass mesh 670. In some embodiments first coating-coupled portion 672 includes one or the other of portions 672a and 672b of piece of fiberglass mesh 670. In the embodiment shown in FIG. 19, second coating-coupled portion 652 includes washers 654 and screw heads 675. First coating-coupled portions 672 and second coating-coupled portions 652 can include many different elements. First coating-coupled portion 672 and second coating-coupled portion 652 can include any element that can be fixedly coupled to a building panel coating.

In the embodiment shown in FIG. 19, coating/frame coupler 602 includes first frame-coupled portion 676 and second frame-coupled portion 656. First frame-coupled portion 676 in this embodiment is second portion 676 of piece of fiberglass mesh 670. Second portion 676 is fixedly coupled to frame 130 horizontal member 134 by any means including adhesive, bonder, or resin. Second frame-coupled portion 656 in this embodiment is screw end 656, which in this embodiment is screwed into horizontal member 134.

In the embodiment shown in FIG. 19, coating/frame coupler 602 includes extension portions 678 and extension portions 658. In this embodiment extension portion 678 includes third portions 678a and 678b of piece of fiberglass mesh 670. In this embodiment extension portion 658 includes screw shafts 658.

First coating-coupled portion 672 and second coating-coupled portion 652 are embedded in coatings 160 while coatings 160 are still wet. First coating-coupled portion 672 and second coating-coupled portion 652 can be embedded in coating 160 in any layer or position in coating 160. It is to be understood that FIG. 19 is an example only of coating/frame coupler 602 and that many other variations and embodiments are possible according to the invention. In some embodiments building panel 612 is coated on one surface only, in which case coating/frame coupler 602 will be coupled to only one coating on one surface of building panel 612 (see FIG. 21, for example). In some embodiments building panel 612 is coated on more than two surfaces, in which case coating/frame coupler 602 will be coupled to coatings on more than two surfaces of building panel 612.

Coating/frame coupler 602 can be used with any rigid coating that is used to cover a portion of core 158. FIG. 20 shows an example of coating/frame coupler 602 of FIG. 19, with coating 160 replaced with coating 560 discussed earlier. First coating-coupled portion 672 and second coating-coupled portion 652 are embedded in coatings 560 while coatings 560 are still wet. First coating-coupled portion 672 and second coating-coupled portion 652 can be embedded in coating 560 in any layer or position in coating 560. Coating/frame coupler 602 couples coating 560 to frame 130 horizontal member 134. Coating/frame coupler 602 couples coating 560 to frame 130 horizontal member 134 such that coating 560 is held in a fixed spaced relationship with respect to frame 130 horizontal member 134. Coating/frame coupler 602 couples coating 560 to frame 130 horizontal member 134 such that coating 560 is held a distance D from horizontal member 134.

The elements of coating/frame coupler 602 can take many forms. In FIG. 21 coating/frame coupler 602 is illustrated as used with building panel structure 110, where building panel structure 110 includes horizontal building panel 612 that includes joist 134. FIG. 21 shows a cross section of a roof or ceiling portion of a building panel structure 110 according to the invention. Building panel 612 includes core 158 and coating 560 in this embodiment. Core 158 includes blocks 140 and frame 130. Frame 130 in FIG. 21 is represented by horizontal member 134, which in this embodiment is joist 134.

Coating/frame coupler 602 in FIG. 21 couples coating 560 on surface 124 of core 158 to joist 134. Coating/frame coupler 602 couples coating 560 to joist 134 so that if blocks 140 are melted or crushed or otherwise damaged, coating 560 continues to be held securely to joist 134. Coating 560 will not drop from the ceiling or roof in a fire, for instance, but will continue to be held securely to joist 134 so that building panel 112 remains strong and secure in a fire or other extreme conditions.

Coating/frame coupler 602 in the embodiment shown in FIG. 21 is formed by wrapping mesh 670 around the top of joist 134 in between joist 134 and blocks 140 so that each portion 672a and 672b of mesh 670 protrudes from surface 124 of core 158. Each portion 672a and 672b of mesh 670 is then integrated into coating 560 so that when coating 560 is cured mesh 670 is embedded into coating 560. Thus mesh 670 is one mechanism used by coating/frame coupler 602 to hold coating 560 to frame 130. In addition, washer 654 is coupled to joist 134 with screw 674. Washer 654 is embedded in coating 560 while coating 560 is being formed such that washer 654 is embedded in coating 560 between mesh 570 of first scratch layer A base coat 564 and mesh 770 of outer main brown layer 566.

In the embodiment shown in FIG. 21, first coating-coupled portion 672a is coupled to a first portion of coating 560 on surface 124 of building panel 612. And Second coating-coupled portion 672b is coupled to a second portion of coating 560 on surface 124 of building panel 612.

Coatings 160 and 560 according to the invention are used in building panel 612 to provide structural strength. Coating 560 in some embodiments can also add fire retardation capabilities, aesthetic appeal, as well as other desirable characteristics. Coatings 160 or 560 can be used on any building panel or building panel structure. Coatings 160 or 560 can be used with any embodiment of building panel according to the invention. Coatings 160 or 560 can be used on any building panel structure according to the invention. Coatings 160 or 560 can be used on any building panel embodiment discussed in this document. Coatings 160 or 560 can be used on any building panel structure discussed in this document.

Coating/frame couplers 102, 202, 302, or 602 couple coatings 160 or 560 to frame 130. Coating/frame couplers 102, 202, 302, or 602 couple coatings 160 or 560 to frame 130 such that coatings 160 or 560 are held in a fixed spaced relationship with respect to frame 130. Coating/frame couplers 102, 202, 302, or 602 provide a means for building panels 612 and building panel structure 110 according to the invention to withstand extreme conditions such as a fire. In a particular example, when a fire occurs which melts EPS blocks 140, coatings 160 or 560 will remain securely coupled to frame 130 so that building panels 612 and building panel structure 110 remains standing and intact during the fire. Coating/frame couplers 102, 202, 302, or 602 can be used on any building panel and on any building panel structure. Coating/frame couplers 102, 202, 302, or 602 can be used with any embodiment of building panel according to the invention. Coating/frame couplers 102, 202, 302, or 602 can be used on any building panel structure according to the invention. Coating/frame couplers 102, 202, 302, or 602 can be used on any building panel embodiment discussed in this document. Coating/frame couplers 102, 202, 302, or 602 can be used on any building panel structure discussed in this document.

Figure 22:
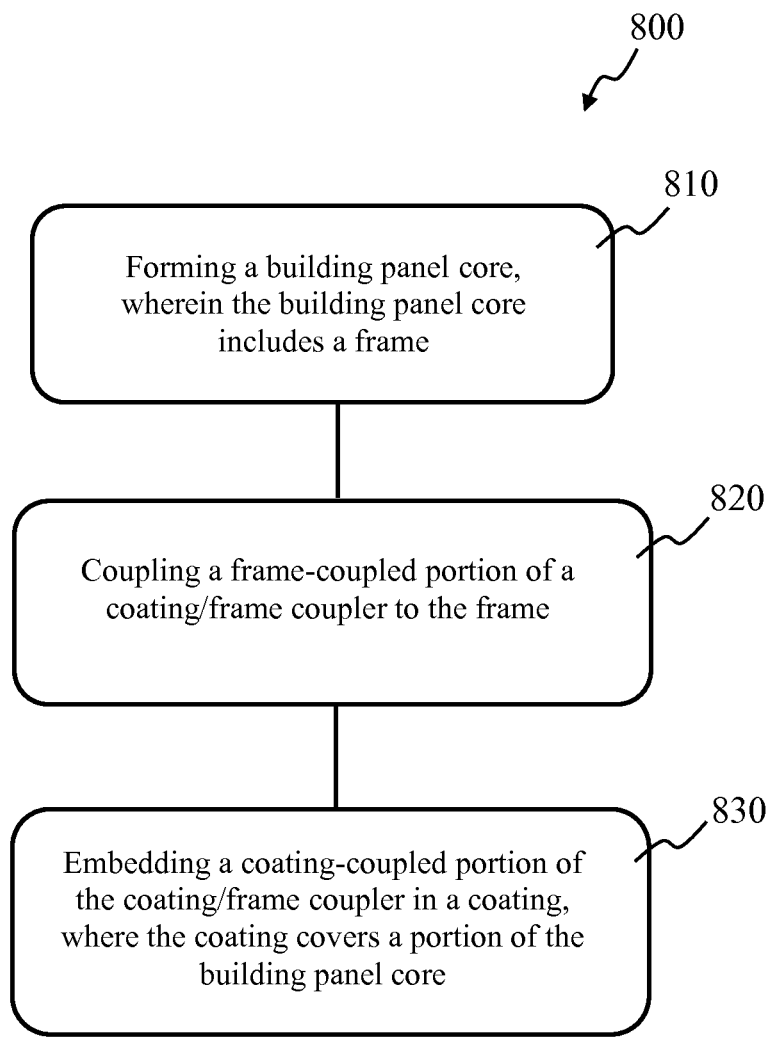
FIG. 22 illustrates method of forming a building panel according to the invention.

FIG. 22 Shows method 800 of forming a building panel according to the invention. Method 800 of forming a building panel includes step 810 forming a building panel core, wherein the building panel core includes a frame. Method 800 according to the invention also includes step 820 coupling a frame-coupled portion of a coating/frame coupler to the frame. And method 800 according to the invention also includes step 830 of embedding a coating-coupled portion of the coating/frame coupler in a coating, where the coating covers a portion of the building panel core.

Method 800 of forming a building panel includes step 810 forming a building panel core, wherein the building panel core includes a frame. In some embodiment the building panel core includes a frame and one or more than one insulating structural block. The building pane core can be any form or type of building panel core, including any of those shown or discussed in this document, or other forms of a building panel core.

Method 800 according to the invention includes step 820 coupling a frame-coupled portion of a coating/frame coupler to the frame. The coating/frame coupler can be any of the types of coating/frame couplers shown or discussed in this document. The coating/frame coupler can be different from those discussed or shown in this document. The frame-coupled portion can be any of the frame-coupled portions shown or discussed in this document. In some embodiments the frame-coupled is different from the frame-coupled portions shown or discussed in this document.

Method 800 according to the invention includes step 830 of embedding a coating-coupled portion of the coating/frame coupler in a coating, where the coating covers a portion of the building panel core. The coating-coupled portion can be any type of coating-coupled portion shown or discussed in this document. The coating-coupled portion can be different from the coating-coupled portions shown and discussed in this document. The coating can be any coating according to the invention as shown or discussed in this document. The coating can be any other coating not shown or discussed in this document.

Figure 28:
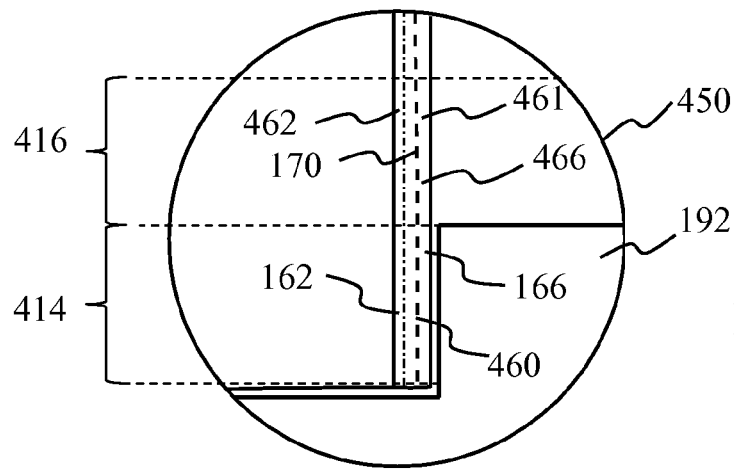
FIG. 28 shows expanded section 450 of FIG. 25, showing a further embodiment of coating 460 and coating 461.
Figure 29:
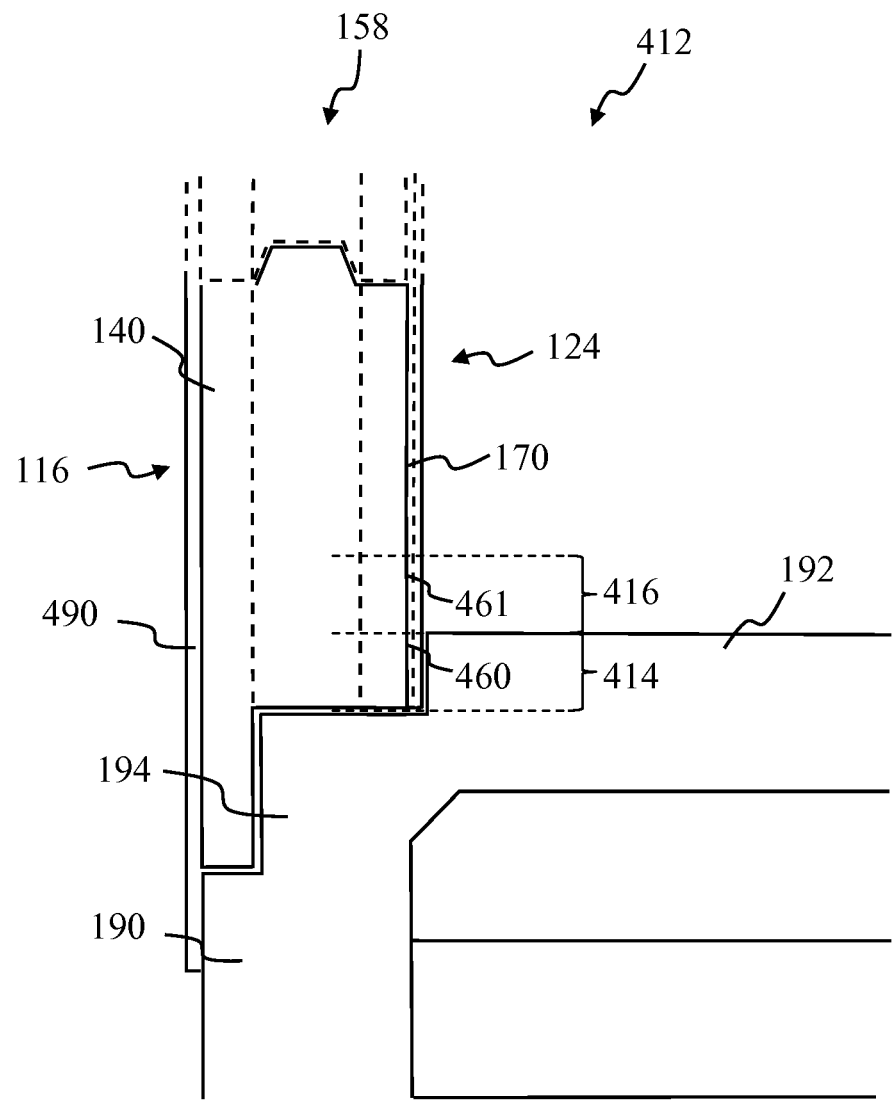
FIG. 29 shows building panel 412 of FIG. 23 with coating 490 applied.
Figure 30:
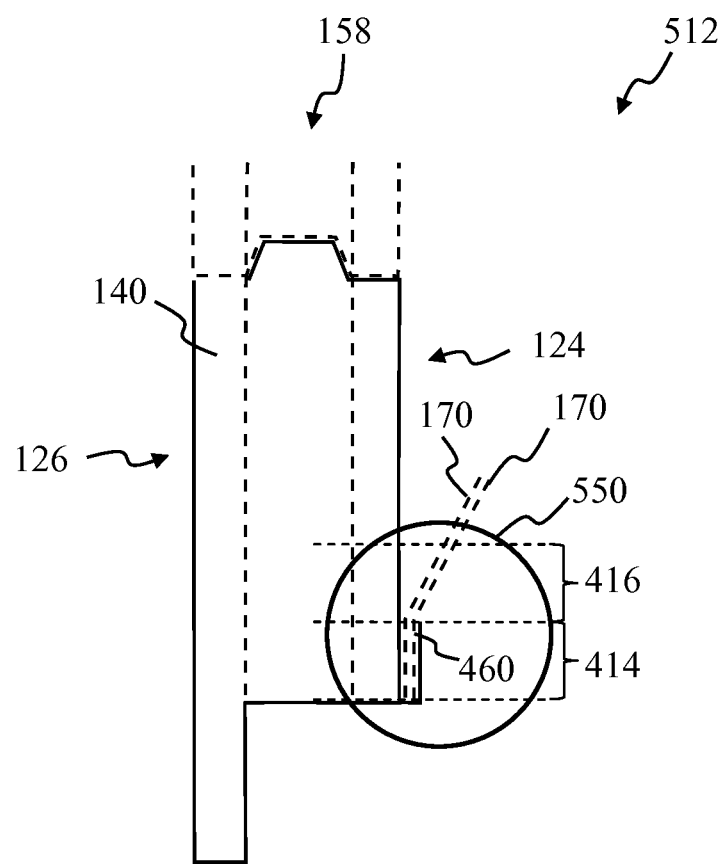
FIG. 30 shows an embodiment of building pane 512 according to the invention, with first coating 460 applied.
Figure 31:
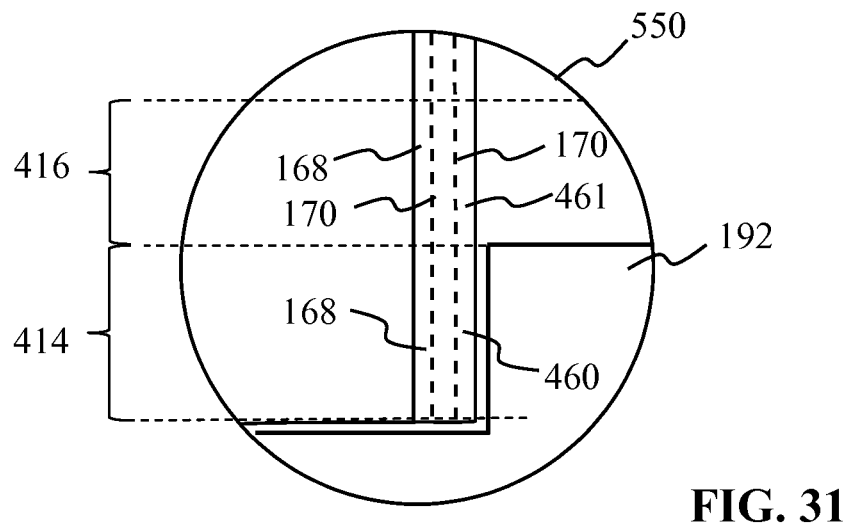
FIG. 31 shows expanded section 550 of FIG. 30, showing one embodiment of coating 460 and coating 461.
Figure 32:
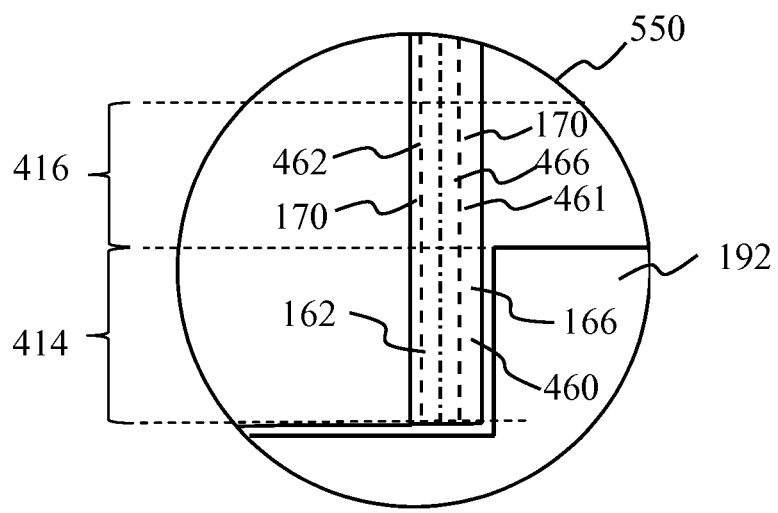
FIG. 32 shows expanded section 550 of FIG. 30, showing another embodiment of coating 460 and coating 461.

FIG. 23 through FIG. 32 show further examples of building panels according to the invention. FIG. 23 through FIG. 29 show building panel 412 according to the invention, and FIG. 30 through FIG. 32 show building panel 512 according to the invention.

Figure 23:
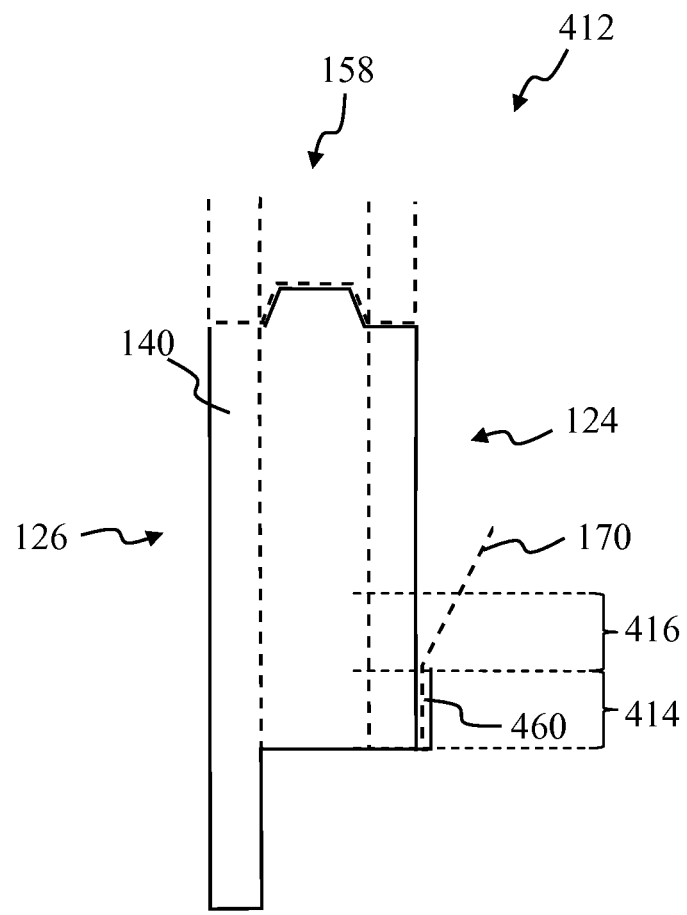
FIG. 23 shows an embodiment of building pane 412 according to the invention, with first coating 460 applied.
Figure 24:
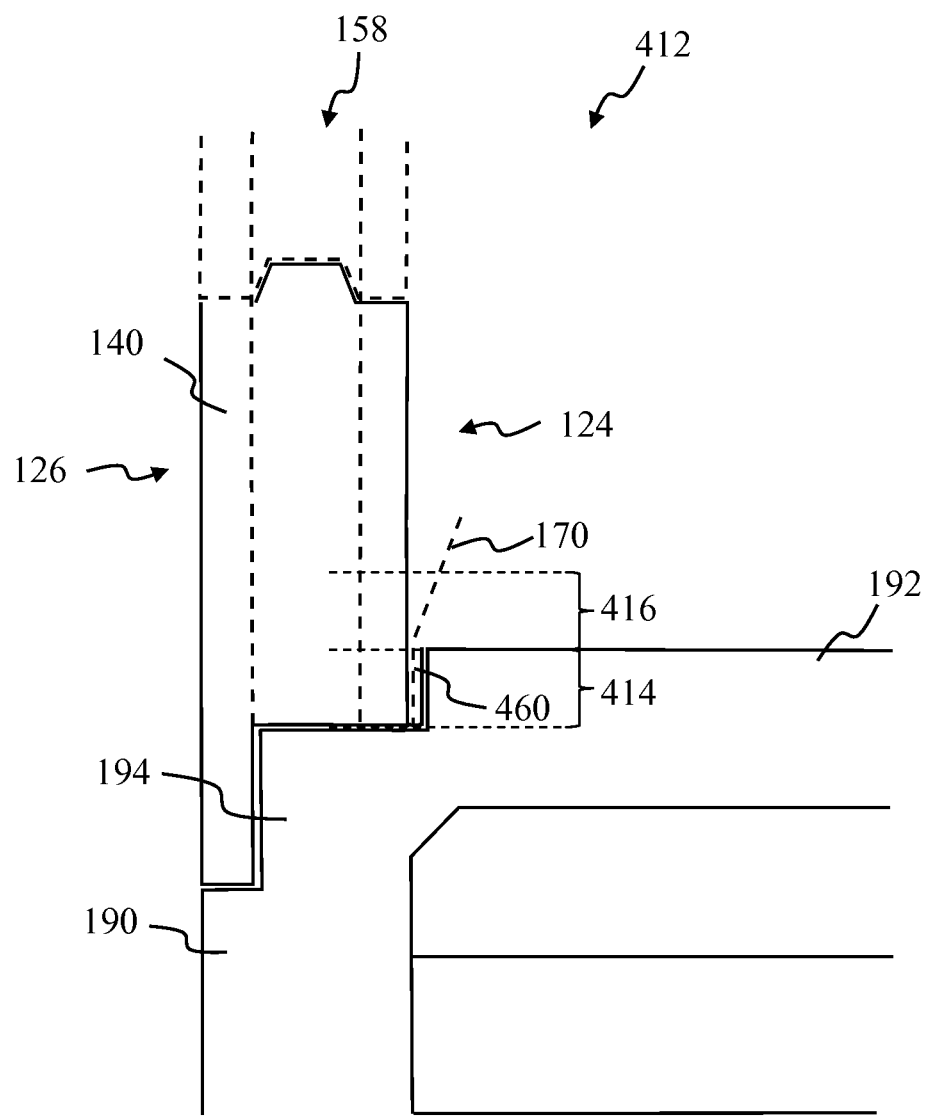
FIG. 24 shows building panel 412 of FIG. 23 coupled to foundation 192 and footer 190.
Figure 25:
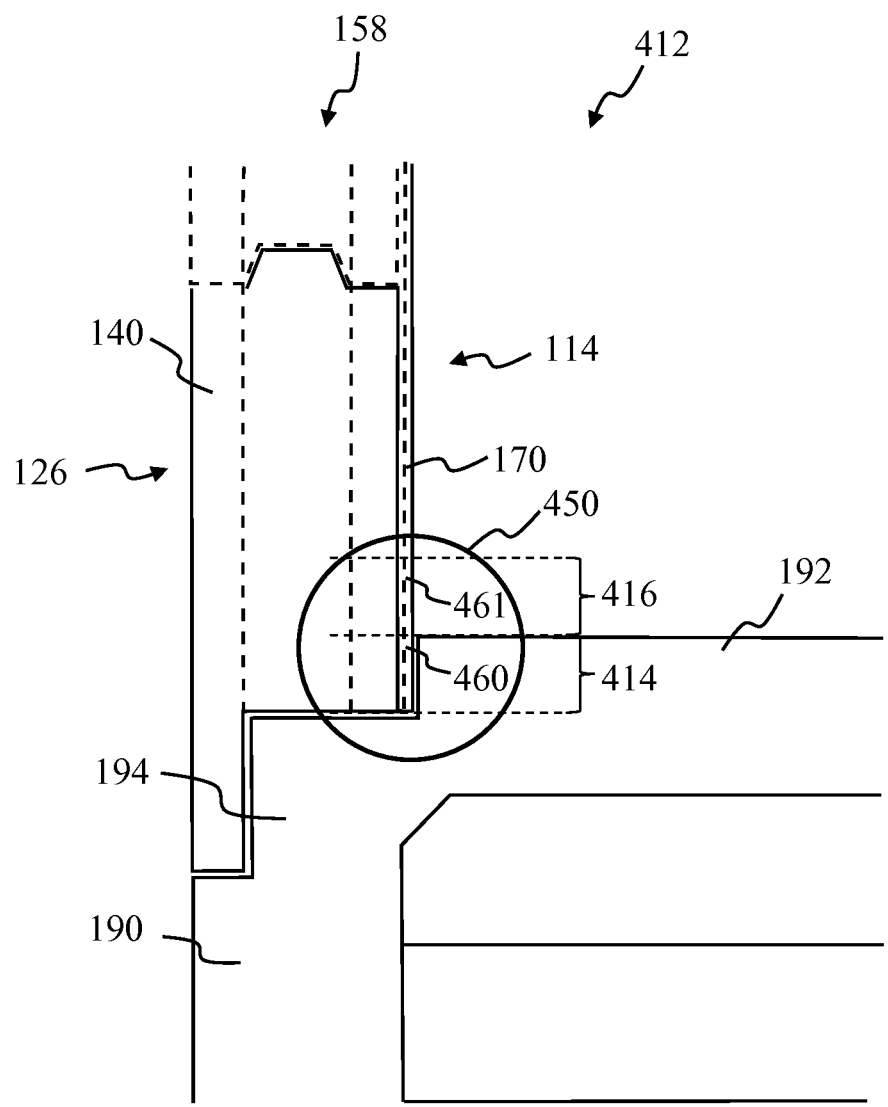
FIG. 25 shows building panel 412 of FIG. 23 with first coating 460 and second coating 461 applied.
Figure 26:
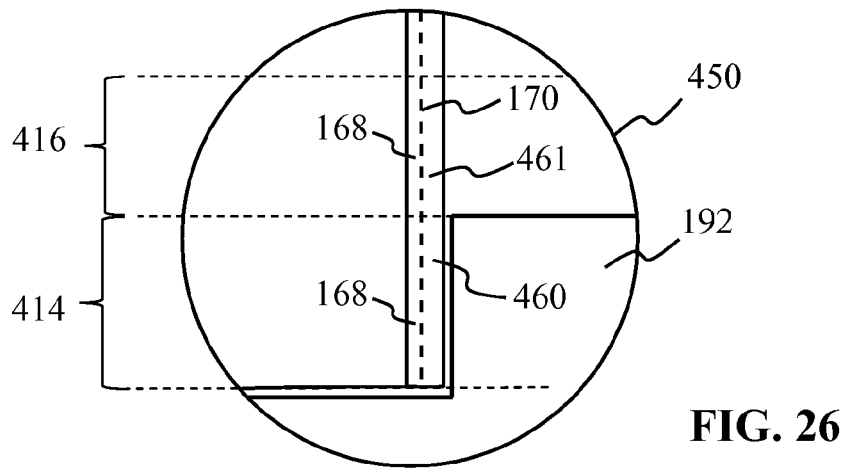
FIG. 26 shows expanded section 450 of FIG. 25, showing one embodiment of coating 460 and coating 461.
Figure 27:
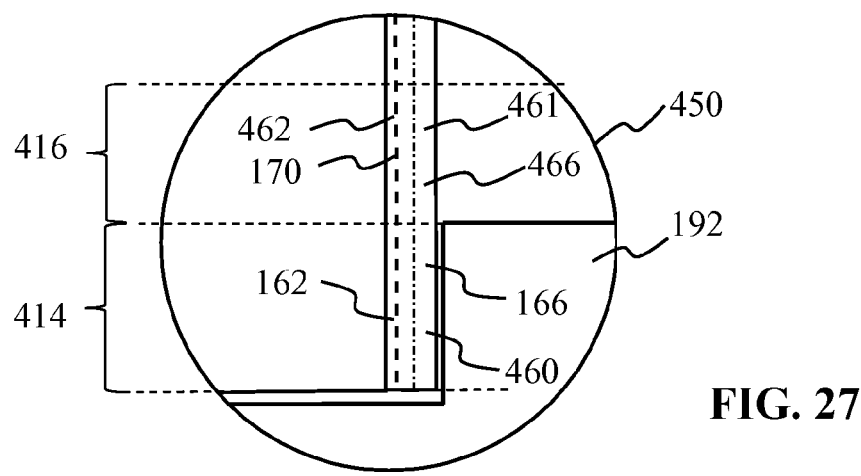
FIG. 27 shows expanded section 450 of FIG. 25, showing another embodiment of coating 460 and coating 461.

FIG. 23 through FIG. 29 show building panel 412 according to the invention. FIG. 23 shows a side view of building panel 412 according to the invention, with coating 460 applied. FIG. 24 shows building panel 412 of FIG. 23 coupled to foundation 192 and footer 190. FIG. 25 shows building panel 412 of FIG. 23 with coating 461 applied. FIG. 26 through FIG. 28 shows expanded view cross sections of section 450 of FIG. 25 showing different embodiments of coating 460 and coating 461. FIG. 29 shows building panel 412 of FIG. 23 with coating 490 applied.

Building panel 412 according to the invention as shown in FIG. 23 is similar to building panel 112 explained earlier except that building panel 412 has two stages of coatings applied. Building panel 412 includes core 158 having front surface 124, rear surface 126, and side surfaces. Building panel 412 includes first coating 460 that is applied to first portion 414 of core 158, where first coating 460 includes piece of fiberglass mesh 170. Building panel 412 also includes second coating 461 (see FIG. 3) that is applied to second portion 416 of core 158.

Coating 460 is applied to first portion 414 of core 158 and allowed to cure, as shown in FIG. 23. Coating 460 covers first portion 414 of core 158 and includes piece of fiberglass mesh 170. After coating 460 is cured, building panel 412 is coupled to foundation 192 as shown in FIG. 24. Building panel 412 can be coupled to foundation 192 and/or footer 190 using any means or method known in the art. In this embodiment building panel 412 is coupled to foundation 192 and footer 190, where footer 190 includes footer tongue 194. Building panel 412 is coupled to foundation 192 such that foundation 192 covers first portion 414 and coating 460 of building panel 412. Coating 460 include fiberglass mesh 170, but piece of fiberglass mesh 170 is cut large enough so that fiberglass mesh 170 protrudes from coating 460 so that fiberglass mesh 170 is included in coating 461 also. In this embodiment, after building panel 412 is coupled to foundation 192, coating 461 is applied to core 158 (FIG. 25), where coating 461 covers second portion 416 of core 158, and where coating 461 includes piece of fiberglass mesh 170—the same piece of fiberglass mesh 170 that is part of coating 460.

In this embodiment building panel 412 includes two different coatings 460 and 461 that are applied to two different portions 414 and 416 of core 158, but they include the same piece of fiberglass mesh 170. This allows the same coating, or different coatings, to be applied to different portions of core 158 at different times during the construction process, but to use the same piece of fiberglass mesh 170, providing structural continuity between the two different coatings that are applied at two different times and/or stages of construction. In the embodiment shown in FIG. 23 through FIG. 29 the first coating is covering first portion 414 of core 158 that is going to be covered by foundation 192. Second coating 461 will be added at a later time or stage, but will be integrated with first coating 460 through fiberglass mesh 170.

FIG. 26 through FIG. 28 show expanded cross-sections of section 450 of FIG. 25, showing example details of coating 460 and 461. Coating 460 and coating 461 can take many different embodiments, including all of the embodiments described for coating 160 or coating 560 described earlier. FIG. 26 through FIG. 28 show several example embodiments. FIG. 26 shows an embodiment where both coating 460 and coating 461 include brown mixture 168, with piece of fiberglass mesh 170 embedded in brown mixture 168. Brown mixture 168 of coating 461 is applied after brown mixture 168 of coating 460 has been cured. FIG. 27 shows an embodiment where coating 460 includes first scratch layer 162, where first scratch layer 162 includes piece of fiberglass mesh 170, and first outer main brown layer 166. Coating 461 in this embodiment includes second scratch layer 462, which in this embodiment contains the same components as first scratch layer 162. Second scratch layer 462 includes piece of fiberglass mesh 170 that was a part of first scratch layer 162. Coating 461 also includes second outer main brown layer 466, which in this embodiment contains the same components as outer main brown layer 166. In the embodiment of coating 460 and 461 shown in FIG. 28, piece of fiberglass mesh 170 is embedded in first and second outer main brown layer 166 and 466 instead of in scratch layer 162 and 462. It is to be understood that many different embodiments of coatings 460 and 461 are possible using the different types of coatings described in this document according to the invention. Whatever components and/or layers are used for coating 460 and 461, coating 460 and 461 according to the invention share piece of fiberglass mesh 170. FIG. 29 shows coating 490 applied to outer surface 126 of core 158 to create outer surface 116 of building panel 412.

FIG. 30 through FIG. 32 show building panel 512, which is similar to building panel 412 except two pieces of fiberglass mesh 170 are used in coating 460 and 461. Coating 460 covers first portion 414 of core 158. Coating 460 includes two pieces of fiberglass mesh 170. Coating 461 covers second portion 416 of core 158. Coating 461 includes the two pieces of fiberglass mesh 170 that are left protruding from coating 460. FIG. 31 and FIG. 32 shows expanded cross sections of section 550 of FIG. 30, showing example embodiments of coatings 460 and 461. In FIG. 31, coating 460 and 461 include brown mixture 168 with the two pieces of fiberglass mesh 170 embedded into the brown mixture 168 while brown mixture 168 is still wet, as explained earlier with regard to coating 160. In FIG. 39, coating 460 includes first scratch layer 162 and first outer main brown layer 166, where each of these layers includes a piece of fiberglass mesh 170. Coating 461 includes second scratch layer 462, which in this embodiment has the same components of first scratch layer 162, and second outer main brown layer 466, which in this embodiment has the same components as first outer main brown layer 166. In coating 460 and 461 of FIG. 32, both first and second scratch layers 162 and 462 and first and second outer main brown layers 166 and 466 include a piece of fiberglass mesh 170, where these two pieces of fiberglass mesh 170 are shared between coatings 460 and 461. Coating 460 and 461 are applied to two different portions 414 and 416 of core 158, and can be applied at different times or different stages of construction of building panel 512, but are integrated with each other by the use of the same two pieces of fiberglass mesh 170 embedded in coatings 460 and 461. Coating 460 and 461 can be formed of any of the mixtures and components discussed earlier with regard to coating 160, 260, 360, 460, or 461.

Figure 33:
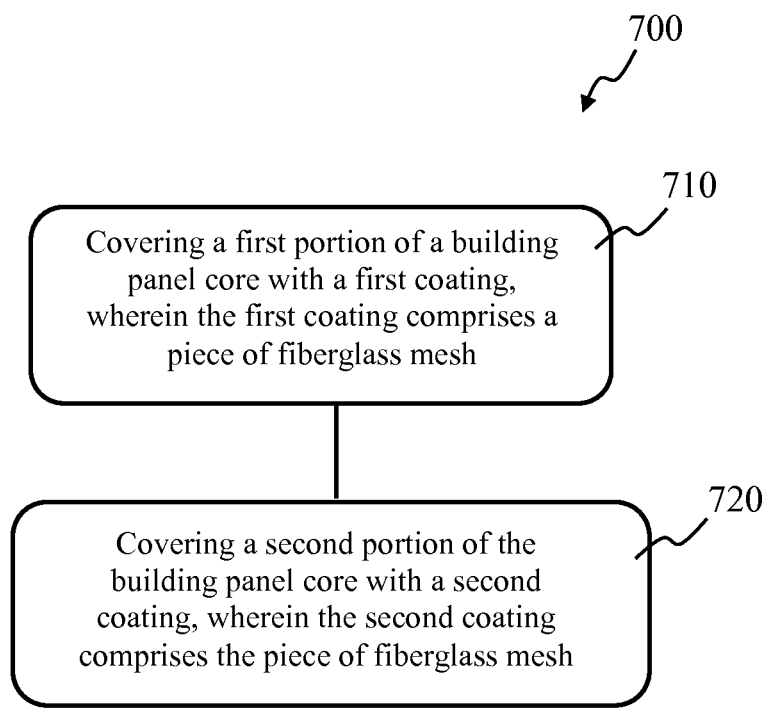
FIG. 33 shows method 700 of forming a building panel according to the invention.

FIG. 33 illustrates method 700 of forming a building panel according to the invention. Method 700 includes step 710 covering a first portion of a building panel core with a first coating, where the first coating includes a piece of fiberglass mesh. Method 700 according to the invention also includes step 720 covering a second portion of the building panel core with a second coating, where the second coating includes the piece of fiberglass mesh. In some embodiments method 700 includes the step of allowing the first coating to cure. In some embodiments method 700 includes the step of coupling the building panel to a foundation, where the foundation covers the first coating. In some embodiments method 700 includes the step of covering a third portion of the building panel core with a third coating, wherein the third portion of the core is on a different surface of the core than the first and the second portion of the core.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A building panel comprising:
   a building panel core comprising a frame and one or more than one insulating structural block;
   a coating covering a portion of the building panel core, wherein the coating comprises:
      an inner scratch layer, wherein the inner scratch layer is a cementitious mixture;
      and
      an outer main brown layer covering a portion of the inner scratch layer, wherein the outer main brown layer is a cementitious mixture;
   and
   a coating/frame coupler, wherein the coating/frame coupler comprises:
      a coating-coupled portion, wherein the coating-coupled portion is fixedly coupled to the outer main brown layer, and wherein the coating-coupled portion is a first portion of a piece of fiberglass mesh, and wherein the first portion of the piece of fiberglass mesh is embedded in the outer main brown layer;
      a frame-coupled portion, wherein the frame-coupled portion is a second portion of the piece of fiberglass mesh, and wherein the frame-coupled portion is fixedly coupled to the frame;
      and
      an extension portion, where the extension portion couples the coating-coupled portion to the frame-coupled portion;
   wherein the coating/frame coupler holds the coating in a fixed spaced relationship with respect to the frame.

2. The building panel of claim 1, wherein the extension portion is a third portion of the piece of fiberglass mesh.

3. A building panel comprising:
   a building panel core comprising a frame and one or more than one insulating structural block;
   a coating covering a portion of the building panel core, wherein the coating comprises:
      an inner scratch layer, wherein the inner scratch layer is a cementitious mixture;
      and
      an outer main brown layer covering a portion of the inner scratch layer, wherein the outer main brown layer is a cementitious mixture;
      wherein the inner scratch layer and the outer main brown layer are interdigitated, wherein each one of a plurality of crests in the inner scratch layer reside in a corresponding one of a plurality of grooves in the outer main brown layer;
   and
   a coating/frame coupler, wherein the coating/frame coupler comprises:
      a coating-coupled portion, wherein the coating-coupled portion is embedded in the coating;
      a frame-coupled portion, wherein the frame-coupled portion is fixedly coupled to the frame;
      and
      an extension portion, where the extension portion couples the coating-coupled portion to the frame-coupled portion;
   wherein the coating/frame coupler holds the coating in a fixed spaced relationship with respect to the frame.

4. The building panel of claim 3, wherein the coating-coupled portion is embedded in the inner scratch layer.

5. The building panel of claim 3, wherein the coating-coupled portion is embedded in the outer main brown layer.

6. The building panel of claim 3, wherein the coating-coupled portion comprises a screw head.

7. The building panel of claim 6, wherein the screw head is embedded in the inner scratch layer.

8. The building panel of claim 6, wherein the screw head is embedded in the outer main brown layer.

9. The building panel of claim 3, wherein the coating-coupled portion comprises a piece of fiberglass mesh.

10. The building panel of claim 9, wherein the piece of fiberglass mesh is embedded in the inner scratch layer.

11. The building panel of claim 9, wherein the piece of fiberglass mesh is embedded in the outer main brown layer.

12. A building panel comprising:
    a building panel core comprising a frame and one or more than one insulating structural block;
    a coating covering a portion of the building panel core;
    and
    a coating/frame coupler, wherein the coating/frame coupler comprises:
       a coating-coupled portion, wherein the coating-coupled portion is fixedly coupled to the coating, and wherein the coating-coupled portion is a first portion of a piece of fiberglass mesh;
       a frame-coupled portion, wherein the frame-coupled portion is fixedly coupled to the frame, and wherein the frame-coupled portion is a second portion of the piece of fiberglass mesh;
       and
       an extension portion, where the extension portion couples the coating-coupled portion to the frame-coupled portion;
    wherein the coating/frame coupler holds the coating in a fixed spaced relationship with respect to the frame.

13. The building panel of claim 12, wherein the extension portion is a third portion of the piece of fiberglass mesh.

14. The building panel of claim 12, wherein the coating comprises:
    an inner scratch layer, wherein the inner scratch layer is a cementitious mixture;
    and
    an outer main brown layer covering a portion of the inner scratch layer, wherein the outer main brown layer is a cementitious mixture;
    wherein the coating-coupled portion is embedded in the inner scratch layer.

\* \* \* \* \*